United States Patent [19]

Akagi

[11] Patent Number: 5,549,982
[45] Date of Patent: Aug. 27, 1996

[54] FUEL CELL

[75] Inventor: Kosuke Akagi, Ikoma, Japan

[73] Assignee: Osaka Gas Co., Ltd., Japan

[21] Appl. No.: 537,136

[22] Filed: Sep. 29, 1995

[30] Foreign Application Priority Data

Oct. 3, 1994 [JP] Japan .................................. 6-238968
Jun. 1, 1995 [JP] Japan .................................. 7-134898

[51] Int. Cl.$^6$ ......................................... H01M 8/04
[52] U.S. Cl. .................... 429/30; 429/38; 429/39
[58] Field of Search ............................. 429/30, 32, 34, 429/38, 39

[56] References Cited

U.S. PATENT DOCUMENTS 5,350,642  9/1994  Akagi ........................................ 429/32
5,376,473  12/1994  Akagi ........................................ 429/34

*Primary Examiner*—Anthony Skapars
*Attorney, Agent, or Firm*—Webb Ziesenheim Bruening Logsdon Orkin & Hanson, P.C.

[57] ABSTRACT

In a fuel cell, a plurality of cells juxtaposed side by side to constitute together a cell layer and a plurality of cell layers thus prepared are stacked one above another to constitute together a multi-layered fuel cell assembly, In each cell layer, adjacent cells are interconnected and supported via a cell connecting plate member. This connecting plate member includes a cutout extending from one edge to the other opposite edge of the member along the entire length thereof for allowing insertion of opposed opened sides of the adjacent cells to which the inner cell flow passages are opened. The cutout has a depth substantially same as the thickness of the cell. An abutment face is defined in each end face of a pair of partition wall portions adjacent the cutout and a corresponding abutment face is defined in each closed side of the cell adjacent the opened side. As the cutout is partitioned by the opposed partition wall portions of the cutout and by a further adjacent cell connecting plate member, there is formed a connecting flow passage which interconnects the inner cell passages of the adjacent cells of the layer and which is partitioned from an inter-cell flow passage formed between the cells adjacently stacked in the assembly.

18 Claims, 25 Drawing Sheets

FUEL CELL

BACKGROUND OF THE INVENTION

1. Field of the Invention

The present invention relates to a fuel cell.

2. Description of the Related Art

Basically, a fuel cell comprises a plurality of cells stacked one above another to be electrically connected in series. The greater the area of the cell, the greater the capacity of the fuel cell. On the other hand, there is limit in enlargement of the cell area from the view point of manufacture or cost. Hence, a fuel cell relating to the present invention is of a type where a plurality of cells are juxtaposed the direction of the plane of the cell in such manner that opened end faces (hereinafter, 'opened sides') of the adjacent cells, to which inner cell flow passages of the cells are opened, are opposed to each other. The juxtaposed cells together constitute one 'cell layer'; then a plurality of these cell layers are stacked one above another in serial connection with each other, so as to increase the capacity of the fuel cell.

In such type of fuel cell described supra, in order to connect the adjacent cells in each cell layer and also to stack the plural cells layers to constitute a multi-layered fuel cell assembly, the convention has suggested a construction as shown in FIG. 25. In this construction, a cell assembly NC includes: a first plate member 70 having an accommodating portion 71 having a substantially same thickness as a cell C and functioning to accommodate a cell layer nC and a pair of partition wall portions 72 with which closed sides of the respective cells, to which the inner cell flow passages x of the cells are closed, are placed in sealed contact; and a second plate member 80 having plural of inter-cell flow passage forming openings 81 exposed to the cells C accommodated in the first plate member 70 and plural of mounting portions 82 for mounting thereon opened side edges of the cells C of the cell layer nC accommodated in the first plate member 70 to which side edges the inner cell flow passages x of the cells are opened, with plural of first plate members 70 accommodating the cell layers nC and plural of second plate members 80 being alternately stacked one one another. In this stacked condition, the mounting portions 82 of the second plate members 80 support the adjacent cells C of a same cell layer nC and also support these cells C with a predetermined distance from those further cells C of vertically adjacent cell layers nC. Further, adjacent cells C of a same cell layer nC are partitioned from each other by the pair of partition wall portions 72 of the first plate member 70 and the mounting portions 82 of the second plate members 80 adjacently disposed on and under the first plate member 70, so as to form connecting flow passages z. In short, in the conventional construction, cell connector members T comprise the first plate member 70 and the second plate member 80.

However, in the case of the conventional construction, the greater the number of cells constituting each cell layer, the larger the first and second plate members should be formed. However, since there is limit in enlargement of these plate members in view of dimensional precision and possibility of warping thereof, it is impossible to un-limitedly increase the number of cells for constituting the cell layer. Accordingly, there has remained room for improvement in the respect of enlargement of the capacity of the fuel cell.

The present invention has been made in view of the above-described state of the art and its object is to further increase the capacity of a fuel cell.

SUMMARY OF THE INVENTION

For accomplishing the above-noted object, according to the characterizing features of the present invention, in a fuel cell of the afore-mentioned type, the cell connector member comprises a cell connecting plate member including a cutout portion extending from one side edge to the opposite side edge of the plate member, and a pair of partition wall portions provided on opposed sides of the cutout portion and extending along the entire length of the cutout portion.

The cutout portion allows, at each of opposed ends thereof, introduction of an opened side of the cell to which inner cell flow passages of the cell are opened, and the cutout portion has a cutting depth substantially same as the thickness of the cell.

An abutment face is defined in each end face of the partition wall portions disposed on the opposed sides of the cutout portion. The abutment face comes into sealed abutment against a closed side of the cell adjacent the opened side thereof when the closed side is fitted into an end of the cutout portion.

The cell layer is formed when the opened sides of cells are fitted into the opposed ends of the cutout portion of the cell connecting plate member.

The connecting flow passage is formed by the cutout portion of the cell connecting plate member as being partitioned by the partition wall portions opposed to each other across the cutout portion and partitioned also by a further cell connecting plate member adjacent to the former cell connecting plate member.

Functions of the above-described construction will be described next.

A plurality of cells are juxtaposed to each other in the direction of cell plane with the opened sides thereof facing each other, and the cell connecting plate member is interposed between each adjacent pair of juxtaposed cells. To the respective ends of the cutout portion of the cell connecting plate member, the opened sides of the adjacent cells are introduced in such a manner that the closed sides of the cell adjacent the opened sides thereof are placed into sealed abutment against the abutment face. With this, these adjacent cells are interconnected with each other via the cell connecting plate member, thereby to constitute the cell layer. Then, a plurality of cell layers thus prepared are stacked one on another, so as to constitute a fuel cell assembly.

In this assembled condition, a thin portion of each cell connecting plate member defined and left by the formation of the cutout portion serves to support the adjacent cells of each cell layer and to support also those cells adjacent in the stacking direction of the cell layers. Also, the connecting flow passage is formed by the cutout portion of the cell connecting plate member as being partitioned by the partition wall portions opposed to each other across the cutout portion and also by a further cell connecting plate member adjacent to the former cell connecting plate member.

That is to say, this cell connecting plate member is to be disposed between each adjacent pair of cells for interconnecting the same. Accordingly, this cell connecting plate member may be formed small. Further, for increasing the number of cells to constitute each cell layer, this is possible only by increasing the number of the cell connecting plate members in accordance with the increased number of the interconnections between the adjacent cells of the cell layer.

As a result, the number of the cells for constituting the cell layer may be increased as desired, whereby the capacity of the fuel cell assembly may be further increased.

According to a further aspect of the present invention, the cell connecting plate member defines a through hole facing the cutout portion and extending through this plate member in the stacking direction; and the through hole defines an inner gas flow passage for communicating the connecting flow passages of the each cell layer.

Functions of the above-described construction will be described next.

In this type of fuel cell, the gas flowing through the inner cell flow passages is caused to flow via the connecting flow passages. A conventional circuit construction for this gas flow is constructed as follows.

To each of a pair of opposed terminal ends of the cell assembly where the terminal ends of the cell layer in the cell juxtaposing direction are located, the inner cell flow passages of the stacked cells are opened and communicated with an outer gas flow passage provided on each of the opposed terminal ends of the assembly. Then, one of these outer gas flow passages is used as an inner cell gas supply flow passage for supplying the gas to the respective inner cell flow passages of the stacked cells, while the other outer gas flow passage is used as an inner cell gas exhaust flow passage for exhausting the gas from the respective inner cell flow passages of the stacked cells. Accordingly, the gas supplied via the inner cell gas supply flow passage to the inner cell flow passages and then is exhausted via the inner cell gas exhaust flow passage.

On the other hand, according to the above-described construction suggested by the present invention, the through holes defined in the respective cell connecting plate members form the inner gas flow passage. Then, the inner cell gas is caused to flow in this circuitry as follows.

That is, the inner gas flow passage is used as an inner cell gas supply flow passage. Whereas, the outer gas passages provided on the opposed ends of the cell assembly are used as inner cell exhaust gas flow passages. In operation, the inner cell gas is supplied via the inner gas flow passage into the inner cell flow passages. Then, this gas is caused to flow through the inner cell flow passages of the respective cells of this cell layer one after another and then exhausted to the respective outer gas flow passages.

Alternatively, the inner gas flow passage may be used as the inner cell gas exhaust flow passage, while the outer gas flow passages provided on the opposed ends of the cell assembly are used as the inner cell gas supply flow passages. In this case, the inner cell gas is supplied via the two opposed outer gas passages and caused to flow through the inner cell flow passages one after another, and then this gas is exhausted via the inner gas flow passage.

Further, alternatively, a plurality of inner gas flow passages may be provided. So that, one of adjacent inner gas flow passages is used as an inner cell gas supply flow passage and the other is used as an inner cell gas exhaust flow passage. In this case, the inner gas is supplied from the one inner gas flow passage used as the inner cell gas supply flow passage. Then, this gas is caused to flow through the inner cell flow passages of the cells of the cell layer and then exhausted to the other inner gas flow passage used as the inner cell gas exhaust passage.

As a result, in comparison with the convention, the length of the flow passage for guiding the inner cell gas from the inner gas supply flow passage to the inner cell gas exhaust flow passage may be reduced. Then, without increasing the pressure for supplying the inner cell gas, the number of the cells constituting each cell layer may be increased as desired, thereby to further increase the capacity of the fuel cell.

According to a still further aspect of the invention, at least one of the abutment faces is inclined, in the stacking direction of the cell layers, so as to gradually approach the other abutment face as the inclined abutment extends from the end of the cutout portion toward the inner side thereof.

And, the closed side of the cell includes a matching inclined portion which may be placed in sealed abutment against the inclined abutment face.

For partitioning between the connecting flow passage and inter-cell flow passage, each closed side of the cell adjacent the opened side of the cell fitted into the cutout portion of the cell connecting plate member needs to be placed in sealed abutment against the corresponding abutment face of the cell connecting plate member.

Then, according to the above-described construction, the opened side of the cell is inserted into the cutout portion of the cell connecting plate member, and then, this opened side of the cell is pressed against the cell connecting plate member. With this, the inclined portion of the closed side of the cell comes into sealed contact with the inclined abutment face of the cell connecting plate member, thereby to absorb any gap present if any between the distance between the pair of closed sides and the pair of abutment faces. Hence, the distance between the abutment faces does not require significantly high precision.

Incidentally, if the opposed abutment faces were formed flat in parallel with each other along the pair of closed sides of the cell, a high dimensional precision would be required of the distance between the pair of these abutment faces in order to allow such sealed contact between the closed sides and the abutment faces, As a result, the above-described construction allows reduction in the manufacture costs.

According to a still further aspect of the invention, a plurality of the cell assemblies are juxtaposed side by side, with the opened sides thereof to which the inter-cell flow passages are opened being placed in opposition to each other.

With the above-described construction, a plurality of cell assemblies are juxtaposed, with the opened sides thereof to which the inter-cell flow passages are exposed being placed in opposition to each other, so that the juxtaposed cell assemblies together constitute 'a cell-assembly layer'.

In the case of the above construction, when plural cell assemblies are juxtaposed with the opened sides thereof to which the inter-cell flow passages are opened being placed in opposition to each other so as to constitute one cell-assembly layer, on the opposed sides of this cell-assembly layer the inter-cell flow passages arranged in the stacking direction are exposed to the outside. Then, on one of these sides, an inter-cell gas supply flow passage for supplying gas to the inter-cell flow passages is provided, while on the other side an inter-cell gas exhaust flow passage for exhausting the gas from the inter-cell flow passages is provided. In operation, the inter-cell gas for the inter-cell flow passages is supplied from the inter-cell gas supply flow passage and then caused to flow through the respective inter-cell flow passages of the cell assemblies one after another. Thereafter, this inter-cell gas is exhausted via the inter-cell gas exhaust flow passage.

As a result, even when a plurality of cell assemblies are provided side by side, the entire construction requires only one inter-cell gas supply flow passage and one inter-cell gas exhaust passage for the inter-cell flow passages. Hence, while this provides a simple circuit construction for supplying and exhaust the inter-cell gas to and from the inter-cell flow passages of the cell assemblies, this allows further increase of the total capacity of the fuel cell system.

The stacking direction of the cell layers may be the vertical direction.

In this case, first, the cell connecting plate member is placed on e.g. a base mount and opened sides of two cells are fitted to the opposed ends of this cell connecting plate member. Then, a next cell connecting plate member is stacked on the first cell connecting plate member, and to the opposed ends of this second plate member, opened ends of further two cells are fitted. With repetition of these operations, respective cell layers and a multi-layered cell assembly comprised of the stacked cell layers are constructed.

Alternatively, first, a cell layer is placed on the base mount or the like with orienting the cell plane of the layer horizontal, and further cell layers are stacked one on another on the first cell layer, thereby to construct a multi-layered cell assembly.

Accordingly, the above construction may simplify or eliminate means needed for holding the cell connecting plates and the cells in the course of the construction of the multi-layered cell assembly.

As a result, the manufacture of the fuel cell may be further reduced.

Alternatively, the stacking direction of the cell layers may be the horizontal direction.

In this case, for instance, the base mount or the like is placed with its upper face oriented upwards. Then, on this base mount, cell layers are stacked side by side one after another in the horizontal direction with the cell planes thereof being oriented perpendicular to the upper face of the mount, whereby a horizontally multi-layered cell assembly is formed. With this construction, the cell layers may be properly aligned with the aid of the upper surface of the base mount as a reference for the alignment. Accordingly, the construction or means for aligning the cell layers in the stacking direction for constructing a cell assembly may be a simple one.

As a result, the manufacture costs may be further reduced.

Further and other objects, features and effects of the invention will become more apparent from the following more detailed description of the embodiments of the invention with reference to the accompanying drawings.

DETAILED DESCRIPTION OF THE PREFERRED EMBODIMENTS

First Embodiment

With reference to FIGS. 1 through 5, a first embodiment of the invention will be described in details.

First, a schematic construction of a cell assembly NC will be described with reference to FIGS. 1 and 2.

Figure 1:
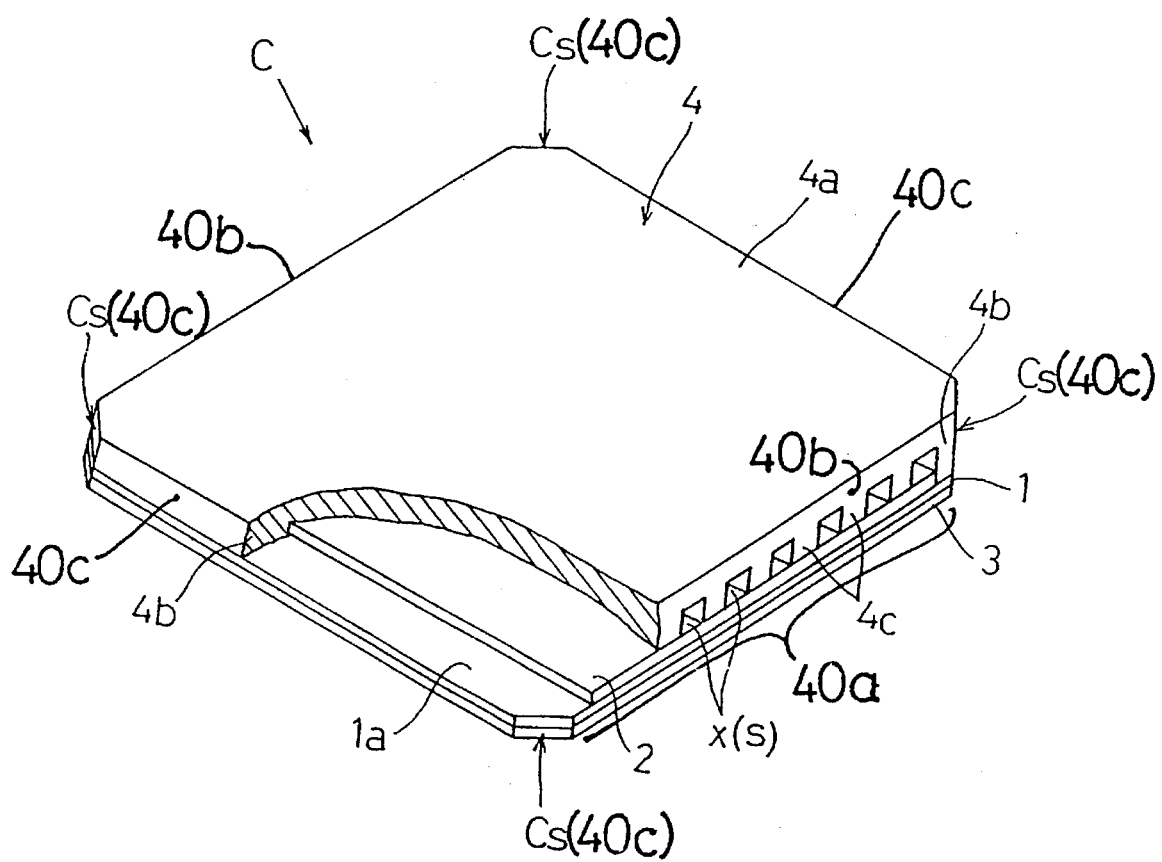
FIG. 1 is a perspective view showing a cell structure according to a first embodiment of the present invention.

As shown in FIG. 1, a single rectangular fuel cell element C includes a solid electrolyte layer 1 having an oxygen electrode 2 on one face thereof and a fuel electrode 3 on the other face thereof, and a conductive separator 4 disposed to face the oxygen electrode 2 as a flow-passage forming member for forming a plurality of inner cell flow passages x. The inner cell flow passages x are opened to a pair of opposed sides of the cell C and are closed to the other pair of sides of the cell. In the following description, these sides to which the inner cell passages x are opened will be referred to simply as opened sides 40a, 40b and those sides to which the inner cell passages x are closed will be referred to as closed sides 40c.

Figure 2:
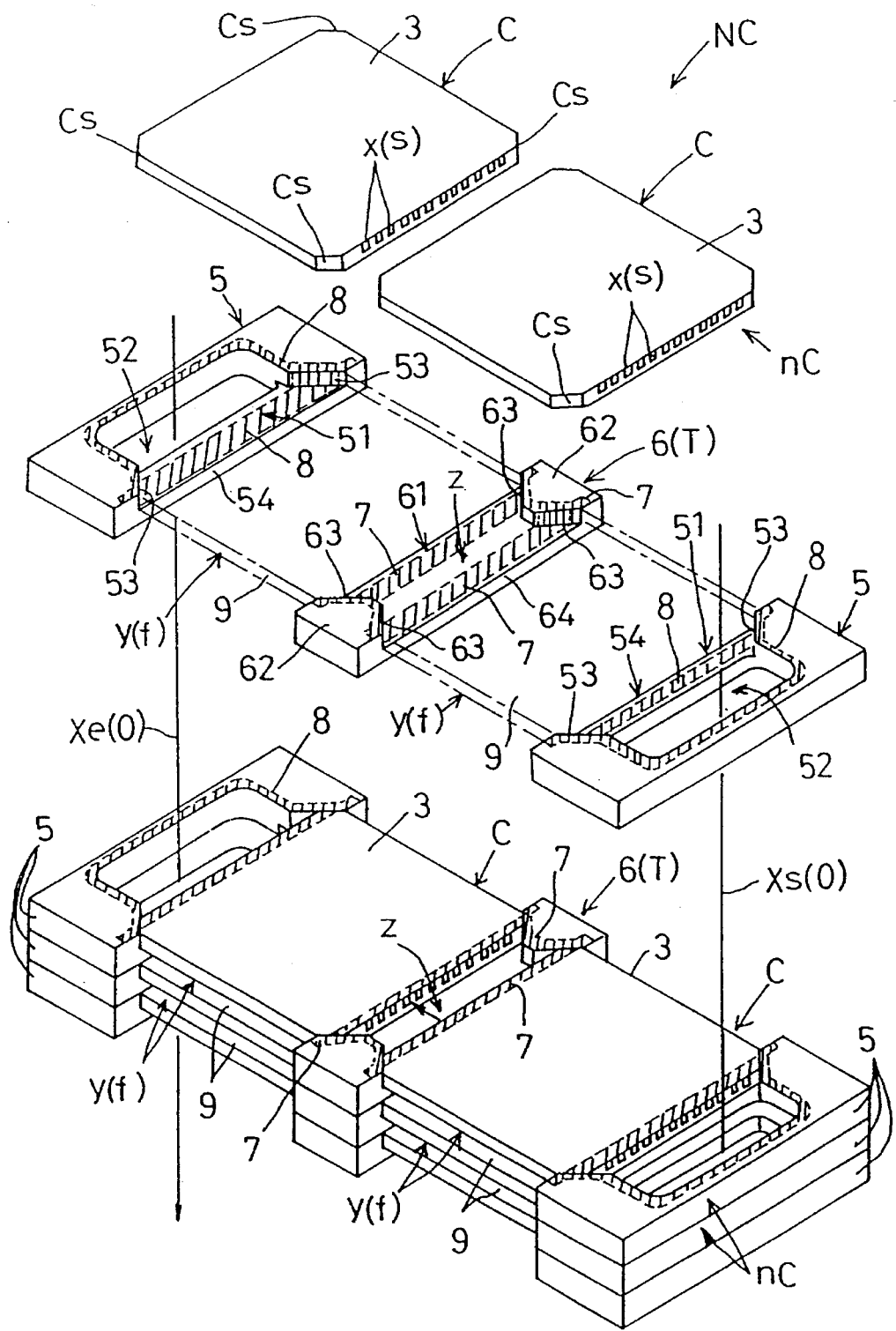
FIG. 2 is an exploded perspective view illustrating a stacking structure of a cell assembly according to the first embodiment.

Then, as shown in FIG. 2, two of the above-described cells C are juxtaposed to each other in the direction of the plane of the cell C with the respective opened sides 40b thereof being aligned to face each other, thereby to constitute together one cell layer nC. And, a plurality of these cell layers nC are stacked one on another to constitute together a a multi-layered cell assembly NC.

Next, additional description will be made on the structure of the cell C of the fuel cell with reference to FIG. 1.

The solid electrolyte layer 1 has a rectangular plate-like configuration. And, on the one face of this solid electrolyte layer 1, there is integrally affixed the oxygen electrode 2 in the form of a film or a plate, with an electrolyte exposed portion 1a being formed on and extending along the entire length of each of the opposed side edges of the solid electrolyte layer 1. Further, the fuel electrode 3 in the form of a film or a plate is integrally affixed to a part of or the entirety of the other side of the solid electrolyte layer 1. With these, there is constructed the cell C in the form of a three-layer plate-like construction for obtaining an electromotive force from the oxygen electrode 2 and the fuel electrode 3.

Preferably, the solid electrode is formed of $ZrO_2$ of tetragonal system with solid solution of Yt in the order of 3 mol.%. The oxygen electrode 2 is formed preferably of $LaMnO_3$. The fuel electrode 3 is formed preferably of carmet of Ni and $ZrO_2$.

The conductive separator 4 is formed of a conductive material and integrally comprises a planar portion 4a, a pair of band-like projections 4b formed on the opposed side ends of the planar portion 4a and a plurality of ridges 4c formed between the adjacent band-like projections 4b. The respective ridges 4c are placed in contact with the oxygen electrode 2 and the pair of band-like projections 4b are affixed to the respective electrolyte exposed portion 1a, thereby to complete the entire cell C, Further, the oxygen electrode 2 and the conductive separator 4 are conductively connected to each other, and between the oxygen electrode 2 and the conductive separator 4, there are formed a plurality of inner cell flow passages x which are opened to one pair of opposed sides of the cell C. The inner cell flow passages x are closed to the other pair of opposed sides of the cell C These inner cell flow passages x are exposed to the oxygen electrode 2 and function as oxygen-containing gas flow passages x for flowing oxygen-containing gas.

Four respective corner portions of the conductive separator 4, solid electrolyte layer 1 and the fuel electrode 3 are chamfered and formed with inclination. Though more details will be given later, with this inclination, there are formed inclined portions Cs at the respective terminal ends of the closed sides 40c of the cell C.

Preferably, the conductive separator 4 is formed of $LaCrO_3$ having good resistance against oxidation and reduction.

Next, with reference to FIG. 2, additional description will be made on a multi-layered stacking structure of the cell assembly NC where adjacent cells C are connected in a cell layer nC and a plurality of the cell layers nC are stacked one above another with a predetermined distance therebetween.

Two cells C are juxtaposed side by side in the direction of the plane of the cell C with orienting the respective opened sides thereof in opposition to each other, and cell holder members 5 are disposed at the respective distal ends of the cells with respect to the juxtaposing direction thereof. Further, a cell connecting plate member 6 is interposed between the cells, thereby to complete one cell layer nC.

The cell holder member 5 will be more particularly described next. This cell holder member 5 has a rectangular shape and includes a cutout portion 51 for introducing the opened side 40a of the cell C, and a through hole 52 facing the cutout portion 51 and extending through in the stacking direction of the cell layers nC. The cutout portion 51 includes a pair of abutment faces 53 against which the closed sides 40c adjacent the opened side 40a of the cell C are to be brought into sealed contact. Further, the cutout portion 51 has a substantially same depth as the thickness of the cell C.

Also, the abutment faces 53 are formed with an inclination with respect to the stacking direction of the cell layers nC such that these faces 53 gradually approach each other as they extend from the opposed ends of the cutout portion 51 to the inner side thereof. In correspondence with this, as described supra, the opposed ends of the closed side 40c of the cell C respectively have the inclined portions Cs which may be brought into matched sealed contact with the inclined abutment faces 53 of the holder member.

Next, additional description will be made on the cell connecting plate member 6.

This cell connecting plate member 6 includes a cutout portion 61 extending from one side edge to the opposing side edge of the plate member and a pair of partition wall portions 62 provided on the opposed sides of the cutout portion 61 and extending for the entire length of the cutout portion 61 with respect to the cell juxtaposing direction.

The cutout portion 61 is capable of introducing, at opposed ends thereof, the opened side 40a of the cell C and this portion 61 has a substantially same depth as the thickness of the cell C. Further, the respective end faces of the partitioning wall portions 62 formed on the opposed sides of the cutout portion 61 include abutment faces 63 against which the closed sides 40c of the cell C are brought into sealed contact. These abutment faces are inclined with respect to the stacking direction of the cell layers nC such that the faces approach each other as they extend from the opposed ends of the cutout portion 61 to the inner side thereof. In correspondence with this, as described above, the closed sides 40c of the cell C include, at the opposed ends thereof, the inclined portions Cs which may be brought into matched sealed contact with the inclined abutment faces 63.

Then, the opened sides 40a of the two adjacent cells C are fitted to the opposed ends of the cutout portion 61 of the cell connecting plate member 6 with the closed sides 40c adjacent the opened sides 40a being placed in sealed contact with the abutment faces 63; and the other opened sides 40a of the respective cells C are fitted to the opposed ends of the cutout portions of the cell holder members 5 with the closed sides 40c adjacent to the respective ends of the opened sides 40a being placed in sealed contact with the abutment faces 53. With these, one cell layer nC is completed. Then, a plurality of these cell layers nC assembled in the manner above are stacked one on another, to constitute together one cell assembly NC.

In this assembled condition, the adjacent cells C of each cell layer nC are supported by thin portions 64 of the cell connecting plate member 6 formed in association with the formation of the cutout portion 61, and the same thin portions 64 support also the vertically adjacent (i.e. adjacent with respect to the stacking direction of the cell layers) cells C of the adjacent cell layers nC with a predetermined distance therebetween. Further, the vertically adjacent cells C are supported with the predetermined inter-distance also, at the other end thereof, by a thin portion 54 of the cell holder member 5 formed in association with the formation of the cutout portion 51.

As the thin portion 54 of the cell holder member 5 and the thin portion 64 of the cell connecting plate member 6 partition between the cell faces of the vertically adjacent cells of the stacked cell layers nC, an inter-cell flow passage y is formed between these cells adjacent each other with respect to the stacking direction of the cell layers nC. This inter-cell flow passage y is closed on the opposed opened sides of the cell C and is opened on the closed sides of the same. Further, this inter-cell flow passage y is exposed to the fuel electrode 3 and functions as a fuel gas flow passage f for circulating a fuel gas containing hydrogen.

Incidentally, when the opened side 40a of the cell C is fitted to the cutout portion 61 of the cell connecting plate member 6, this opened side 40a of the cell C is pressed against the cell connecting plate member 6 so as to bring the inclined portions of the opposed closed sides 40c of the cell C into sealed contact with the respective abutment faces 63. Similarly, when the opened side 40a of the cell C is fitted to the cutout portion 51 of the cell holder member 5, the cell holder member 5 is pressed against the opened side 40a of the cell Cs so as to bring the inclined portions Cs of the opposed closed sides 40c of the cell C into sealed contact with the respective abutment faces 53.

As the cutout portion 61 of the cell connecting plate member 6 is partitioned by the partition wall portions 62 on the opposed sides of this cutout portion 61 and also by a further cell connecting plate member 6 adjacent said cell connecting plate member 6, there is formed a connecting flow passage z which interconnects the inner cell flow passages x of the adjacent cells C of one common cell layer nC and which also partitions and seals these inner cell flow passages x and the inter-cell flow passage y from each other. As denoted by a phantom line in FIG. 2, this gas tight condition is maintained by means of a heat-resistant and electrically insulating sealing member 7 which is disposed among a periphery of the opened side 40b of the cell to which the inner cell flow passages x are opened, the thin portions 64 and the pair of abutment faces 63 of the cell connecting plate member 6 on which the cell C is mounted, and the back face of the adjacent cell connecting plate member 6. As also indicated by the phantom line in FIG. 2, the sealing member 7 is also provided between the cell connecting plate members 6 which are disposed adjacent with respect to the stacking direction of the cell layers nC, so as to maintain the sealed condition between the connecting flow passage z and the outside.

Further, as the thin portions 54 and the pair of abutment faces 53 of the cell holder member 5 on which the cell C is mounted and the back face of the adjacent cell holder member 5 are placed in sealed contact with the periphery of the opened side 40b of the cell C to which the inner cell flow passages x are opened, the inner cell flow passages x and the inter-cell flow passage y are partitioned and sealed from each other. As denoted by a phantom line in FIG. 2, this gas tight sealed condition is maintained by means of a further sealing member 8 which is similar to the sealing member 7 and which is disposed among the periphery of the opened side 40b of the cell C, the thin portion 54 and the pair of abutment faces 53 of the cell holder member 5 on which the cell C is mounted, and the back face of the adjacent cell holder member 5.

In the cell assembly NC, adjacent each of the opposed end faces of the assembly where the terminal ends of the cell layers nC in the cell juxtaposing direction are located, one flow passage which extends continuously in the stacking direction of the cell layers nC is formed by means of the respective through holes 52 of the stacked cell holder members 5. And, these two flow passages are used as outer gas flow passages O communicated with the inner cell flow passages x of the respective cells C disposed in the stacking direction of the cell layers nC. Incidentally, as indicated by a phantom line in FIG. 2, the sealing member 8 is provided also between the cell holder members 6 adjacently disposed with respect to the stacking direction of the cell layers nC, so as to maintain the sealed condition between the outer gas flow passages O and the outside.

Then, one of the two opposed outer gas flow passages O is used as an inner cell gas supply passage Xs for supplying the inner cell gas for and to the inner cell flow passages x, while the other outer gas flow passage O is used as an inner cell gas exhaust passage Xe for exhaust the inner cell gas from the inner cell flow passages x.

Between the cells adjacent in the cell layer stacking direction, i.e. within the inter-cell flow passage y, a gas-permeable soft conductive member 9 is provided for conductively interconnecting these cells adjacent in the cell layer stacking direction.

Preferably, this soft conductive member 9 is formed of a felt material of Ni Which has superior heat resistant and reduction resistant properties. Also, the cell holder member 5 and the cell connecting plate member 6 are formed, preferably, of a ceramic material having good heat resistant and electro-insulating properties.

Accordingly, the cell connecting plate member 6 supports the horizontally adjacent cells C of one cell layer nC and supports also the vertically adjacent cells disposed adjacent in the stacking direction of the cell layers nC with the predetermined distance therebetween. Moreover, this cell connecting plate member 6 further serves to interconnect the inner cell flow passages x of the adjacent cells of the cell layer nC and also to partition and seal these inner cell flow passages x from the inter-cell flow passage y. Hence, this cell connecting plate member 6 functions as a cell connecting member T.

Figure 3:
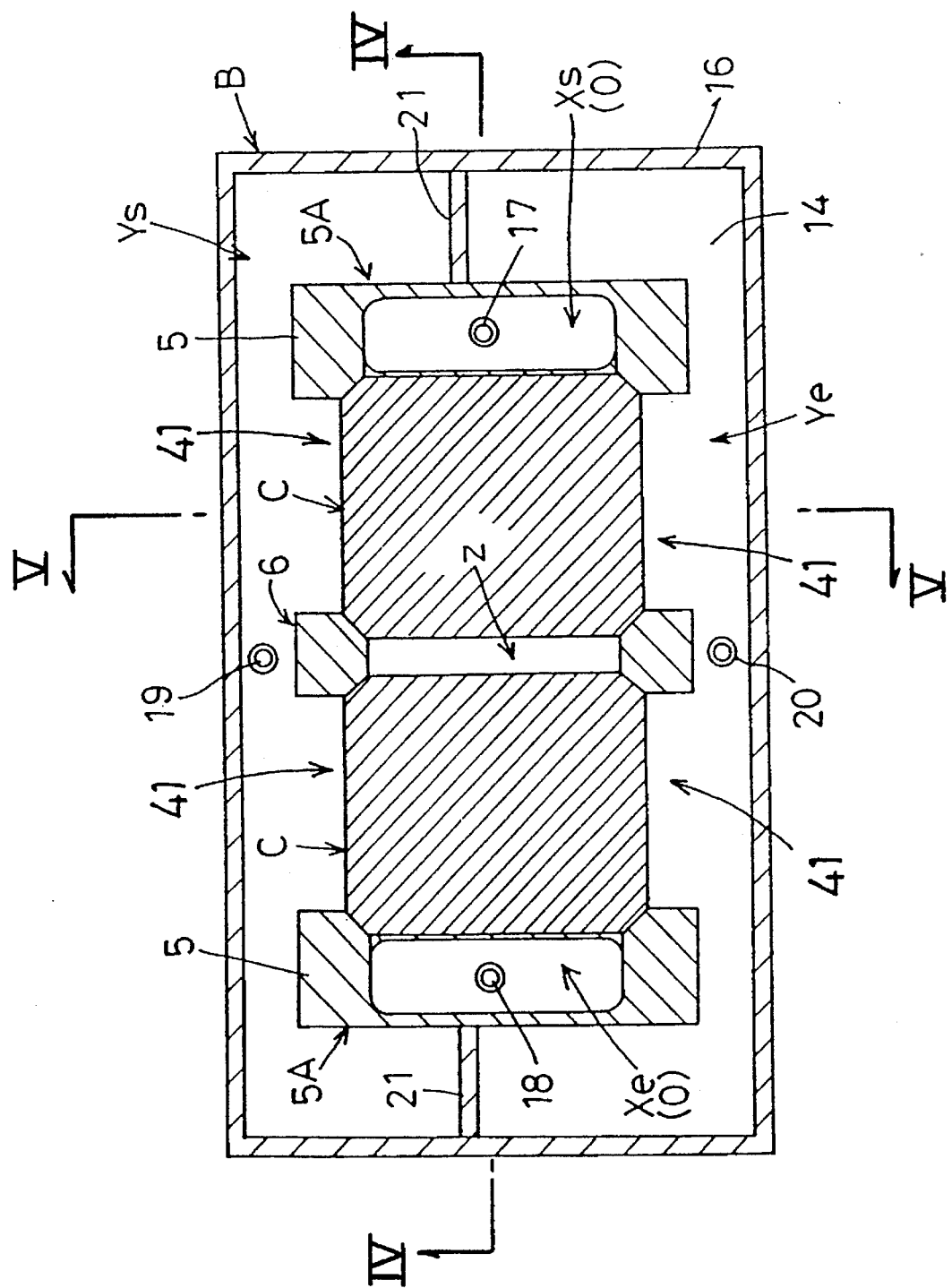
FIG. 3 is a plane view in horizontal section showing an entire construction of a fuel cell according to the first embodiment.
Figure 4:
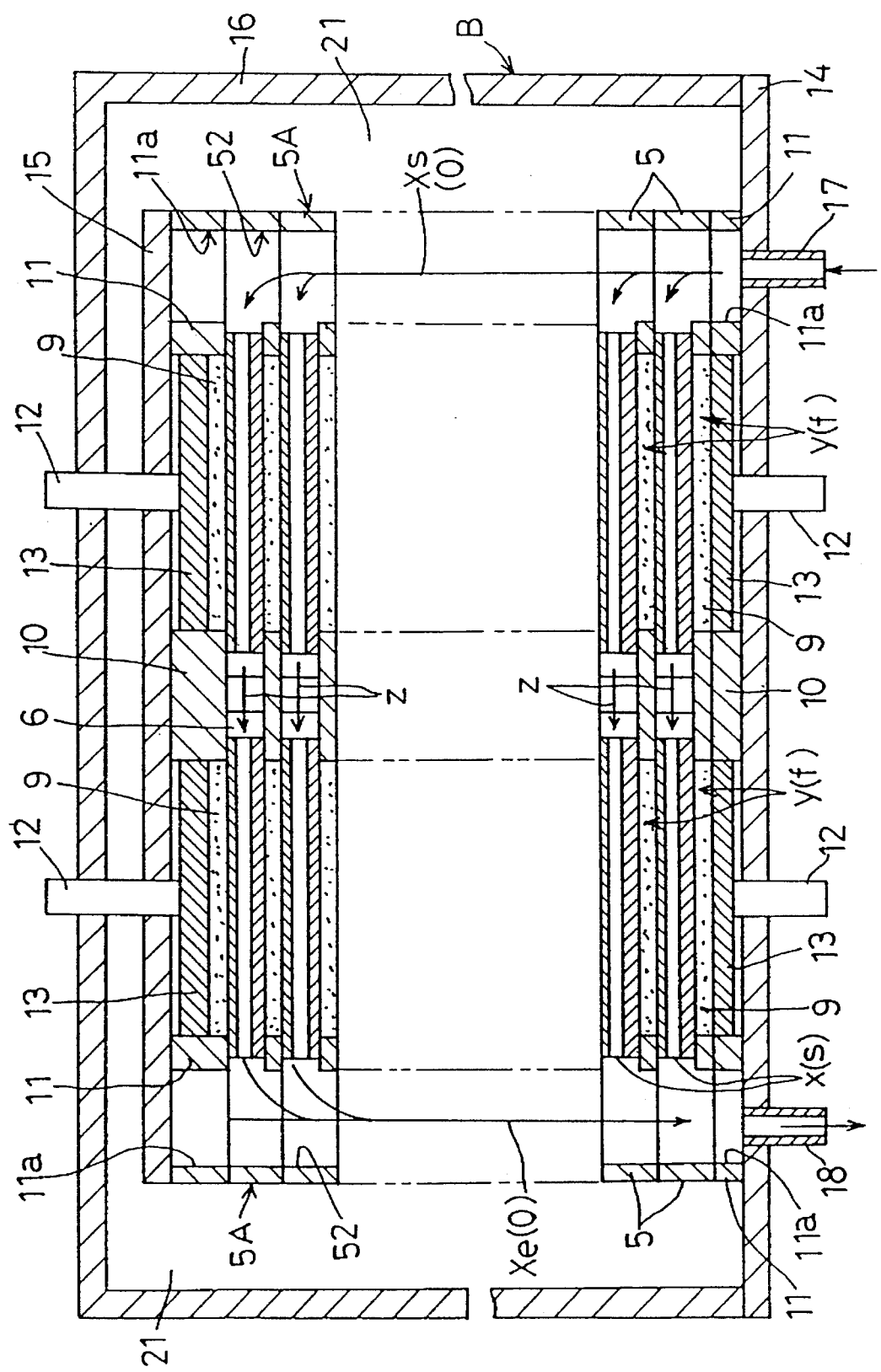
FIG. 4 is a section taken along a line IV—IV in FIG. 3.
Figure 5:
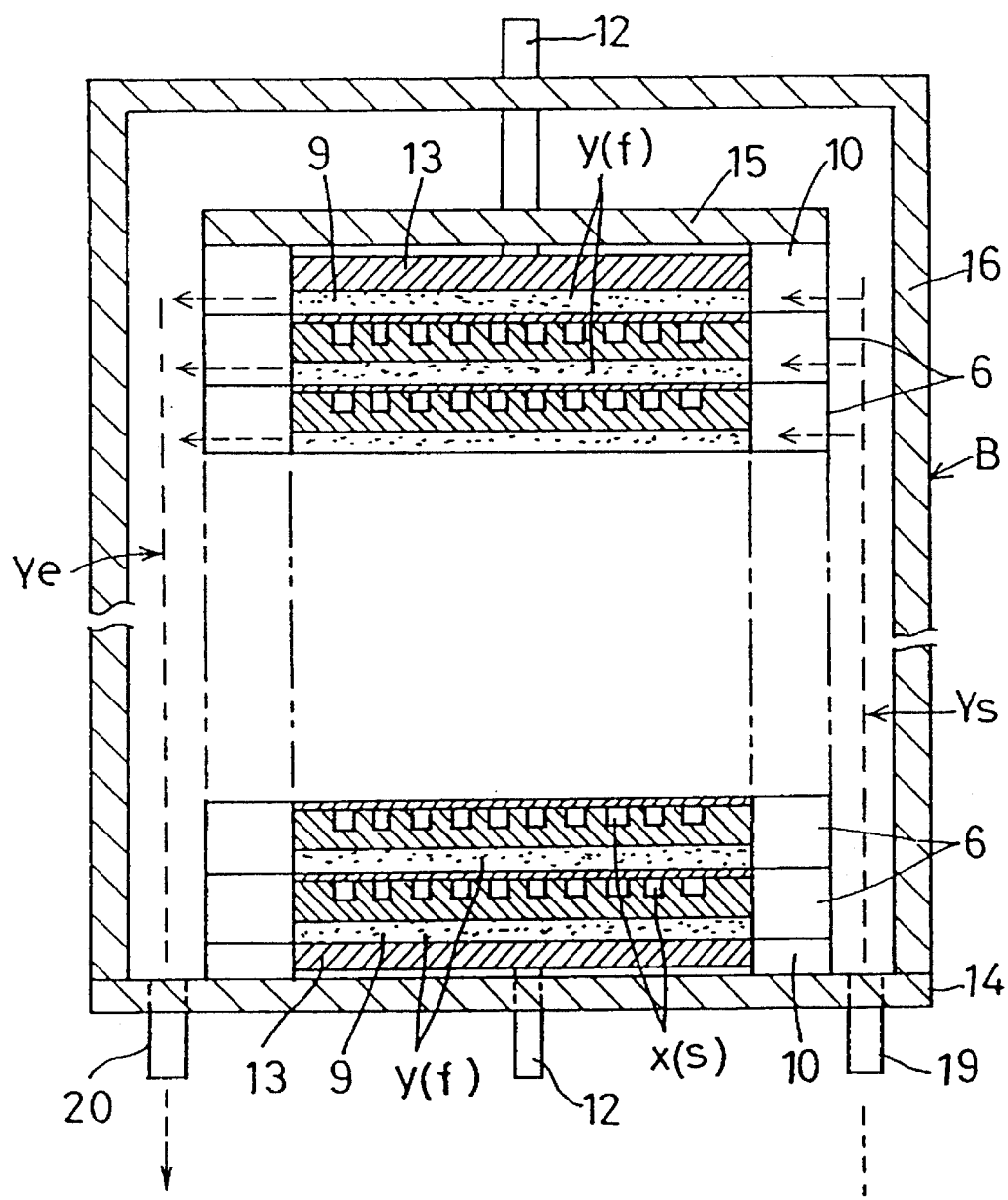
FIG. 5 is a section taken along a line V—V in FIG. 3.

Next, the overall construction of the fuel cell will be described with reference to FIGS. 3 through 5.

At each of the opposed terminal ends of the cell assembly NC with respect to the stacking direction, a collector-plate holder member 10 is laid on the cell connecting plate member 6 and a further collector-plate holder member 11 is laid on the cell holder member 5. The collector-plate holder member 10 comprises a plate-like member, but this member lacks any portion which corresponds to the cutout portion 63 of the cell connecting plate member 6. The other collector-plate holder member 11 also comprises a plate-like member, and this member 11 includes a hole 11a which corresponds in shape to the hole 52 of the cell holder member 5. But, this member 11 does not lave any portion which corresponds to the cutout portion 51 oil the cell holder member 5.

Between the collector-plate holder member 10 and the other collector-plate holder member 11, a collector plate 13, to which terminal bar elements 12 are fixed, is interposed so as to contact with the soft conductive member 9, so that an output electric power is obtained from the two terminal bar elements 12.

Then, the cell assembly NC having the collector plate 13 having the terminal bar elements 12 fixed thereto is mounted on a base mount 14, and a cover member 15 is disposed on the top face of the cell assembly NC. And, an angular cylindrical member 16 having a bottom or top and accommodating the cell assembly NC therein is mounted on the base mount 14.

Incidentally, the cover member 15 serves to close the top openings of the opposed outer gas flow passages O, and the base mount 14 serves to close the bottom opening of the angular cylindrical member 16 and the bottom openings of the opposed outer gas flow passages O.

That is to say, the base mount 14 and the angular cylindrical member 16 together constitute a box member B, in which the cell assembly NC is accommodated. And, a pair of side faces ('opened sides 41', hereinafter) at which the closed sides of the cells C of the cell assembly NC are located face the interior of the box member B and the inter-cell flow passages y are opened to the interior of the box member B.

The terminal bar elements 12 disposed on the top of the cell assembly NC are caused to project to the outside of the box member B with the bar elements 12 extending through the cover member 15 and the top of the angular cylindrical member 16 in a gas tight sealed state.

Further, one of a pair of partition walls 21 is provided to be connected with a wall face 5A formed by the end faces of the stacked cell holder members 5 and with the inner face of the box member B, i.e. the inner face of the base mount 14 and the inner face of the angular cylindrical member 16. And, the other partition wall 21 is provided to be connected with the other end faces of the stacked cell holder members 5 and with the inner face of the box member B, i.e. the inner face of the base mount 14 and the inner face of the angular cylindrical member 16. With these arrangements, the interior of the box member B is partitioned into two sections. And, one of the opposed pair of opened sides of the cell assembly NC faces one of the two sections, and the other opened side of the same faces the other section, respectively. Accordingly, one of these two sections is used as an inter-cell gas supply flow passage Ys for supplying the inter-cell gas to the respective inter-cell flow passages Y, while the other section is used as an inter-cell gas exhaust flow passage Ye for exhausting the inter-cell gas from the respective inter-cell flow passages y.

The one outer gas flow passage O used as the inner cell gas supply passage Xs is communicated with an inner cell gas supply pipe 17, and the other outer gas flow passage O used as the inner cell gas exhaust passage Xe is communicated with a inner cell gas exhaust pipe 18. Further, the inter-cell gas supply passage Ys is communicated with an inter-cell gas supply pipe 19, and the inter-cell gas exhaust passage Ye is communicated with an inter-cell gas exhaust pipe 20.

Accordingly, the inner cell gas supplied from the inner cell gas supply pipe 17 to the inner cell supply gas passage Xs flows through the respective inner cell flow passages x of the cells C of the respective cell layers nC via the connecting flow passages z and then flows into the inner cell gas exhaust passage Xe to be exhausted through the inner cell gas exhaust pipe 18. On the other hand, the inter-cell gas supplied from the inter-cell gas supply pipe 19 into the inter-cell gas supply passage Ys flows through the respective inter-cell flow passages y and then flows into the inter-cell gas exhaust passage Ye to be exhausted through the inter-cell gas exhaust pipe 20.

Second Embodiment

A second embodiment of the invention will be described next with reference to FIGS. 6 through 9.

Each cell C used in this embodiment has the identical construction as those used in the first embodiment. Therefore, no description will be repeated on this.

Figure 6:
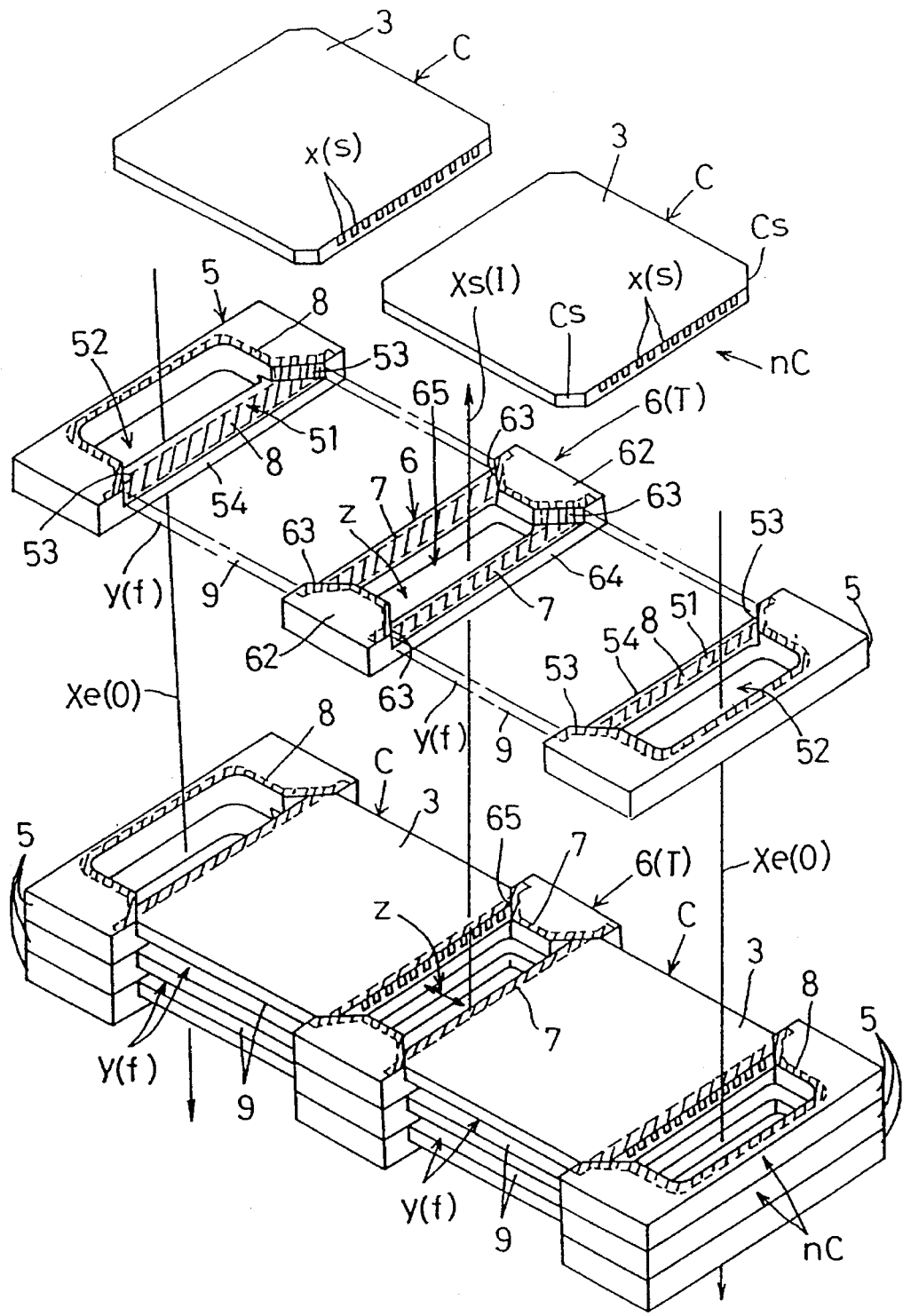
FIG. 6 is a perspective view showing a cell structure according to a second embodiment of the present invention.

As shown in FIG. 6, by means of the same stacking structure as the first embodiment except for one respect described infra, adjacent cells C of each cell layer nC and a plurality of cell layers nC are disposed one above another with a predetermined vertical distance therebetween, thereby to constitute together a multi-layered cell assembly NC.

The difference from the foregoing first embodiment is that the cell connecting plate member 6 used in this second embodiment defines a through hole 65 facing the cutout portion 61 and extending through the stacking direction of the cell layer nC. And, the through holes 65 of the stacked cell connecting plate members 65 together form an inner gas flow passage I continuously interconnecting the connecting flow passages z of the respective cell layers nC in the stacking direction thereof. And, this inner gas flow passage I is used as the inner cell gas supply flow passage Xs, whereas the opposed outer gas flow passages O are used as the inner cell gas exhaust passage Xe.

Figure 7:
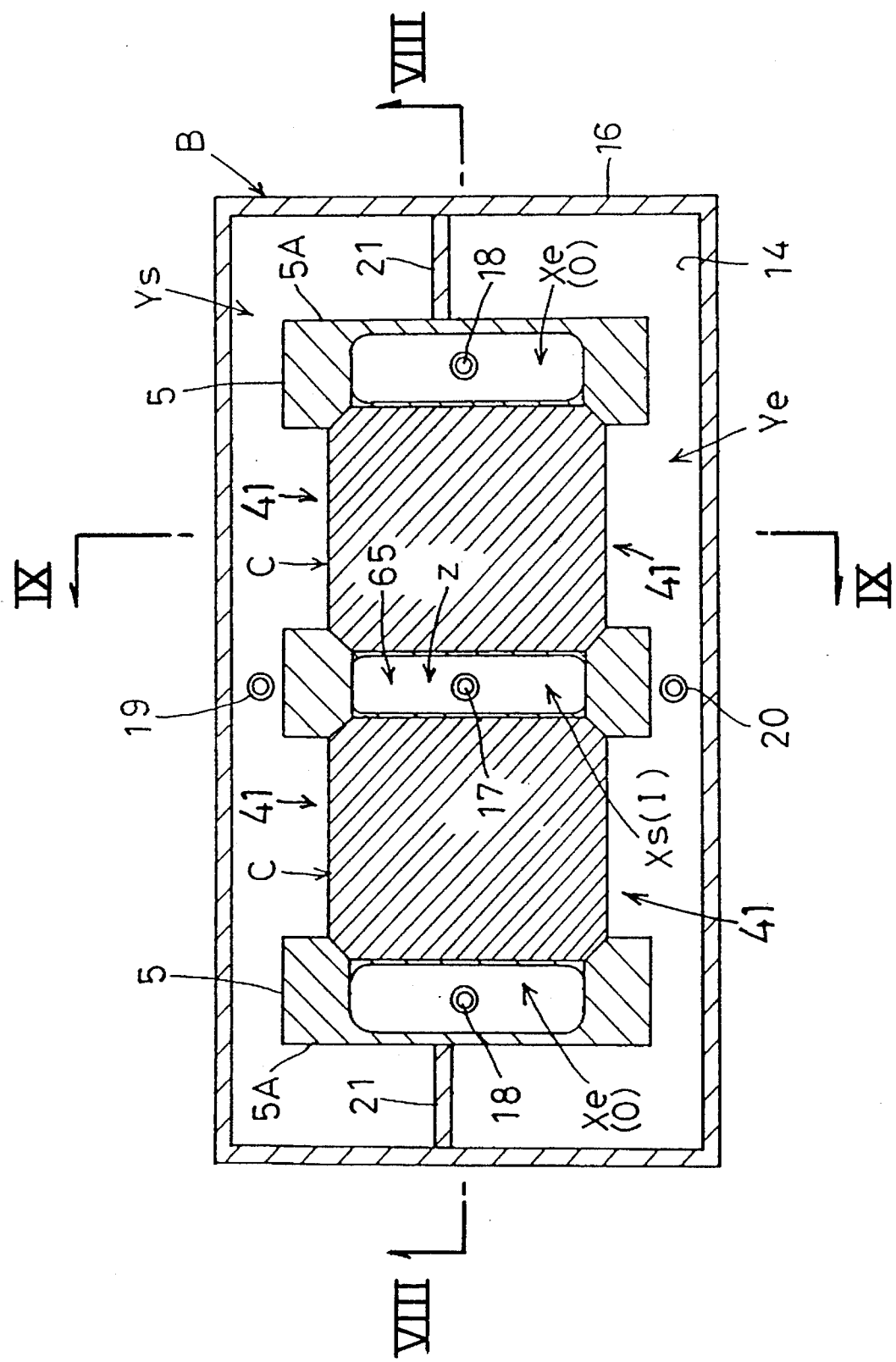
FIG. 7 is a plane view in horizontal section showing an entire construction of a fuel cell according to the second embodiment.
Figure 8:
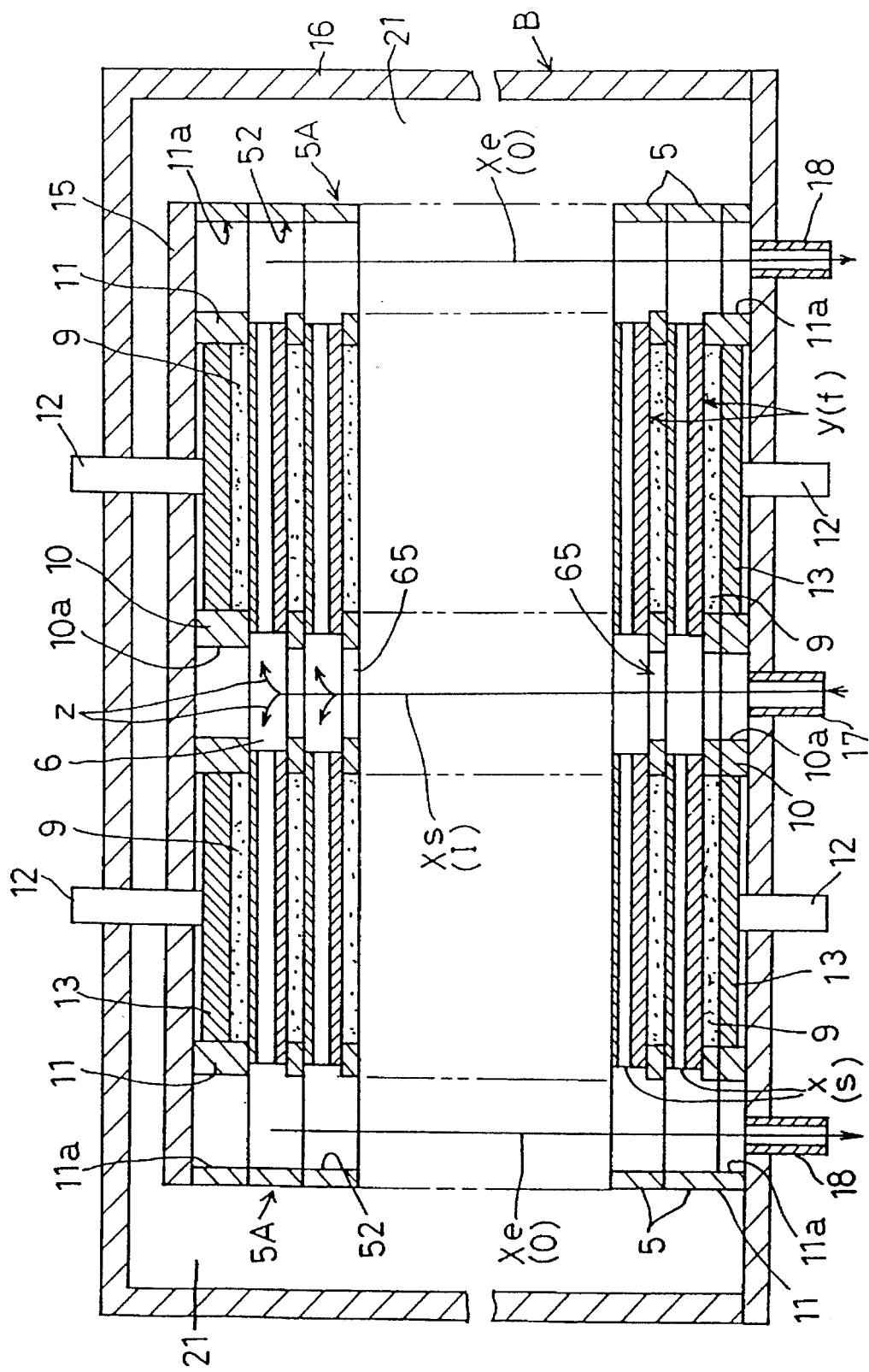
FIG. 8 is a section taken along a line VIII—VIII in FIG. 7.
Figure 9:
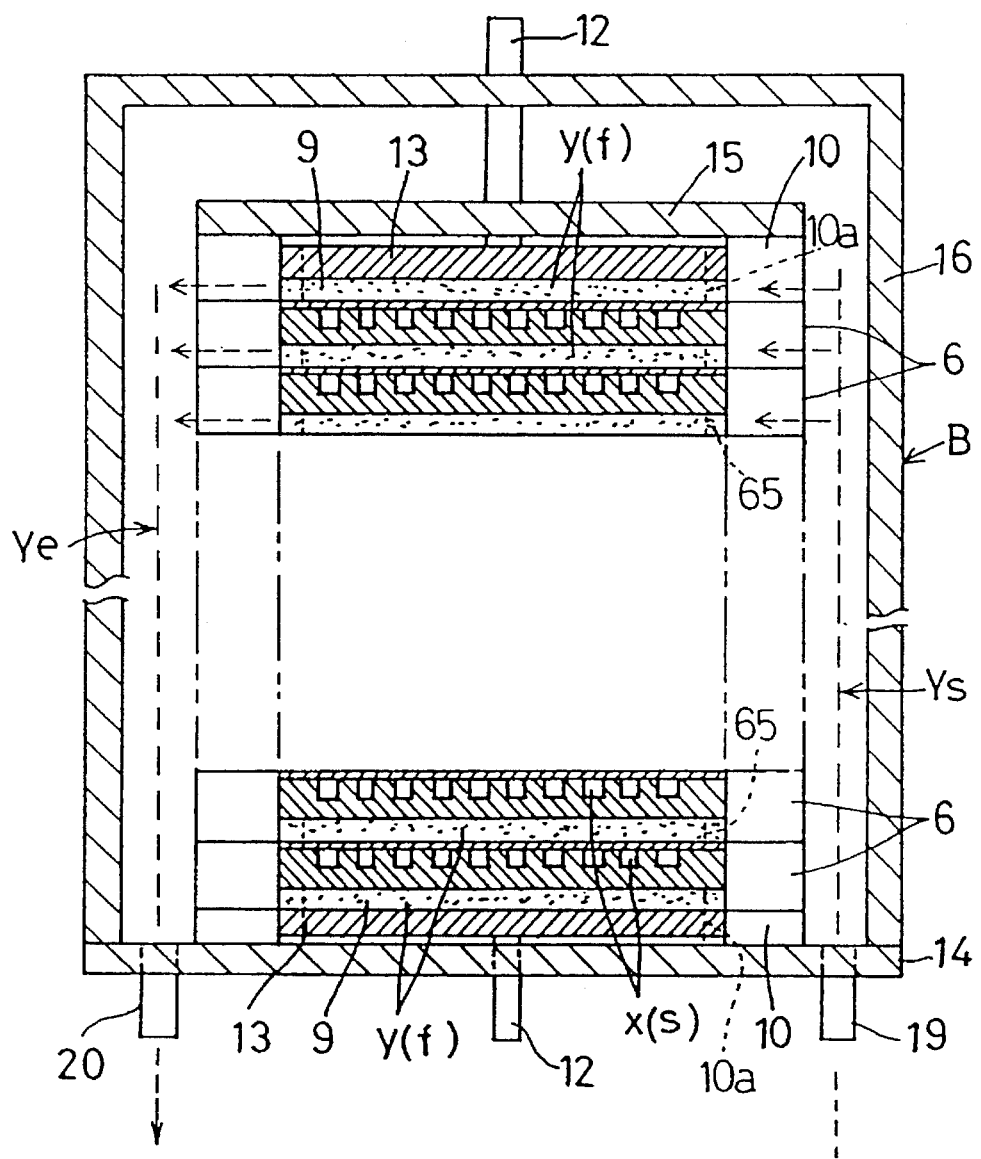
FIG. 9 is a section taken along a line IX—IX in FIG. 7.

As shown in FIGS. 7 through 9, except for some respects described infra, the construction of the fuel cell of this embodiment is identical to that of the first embodiment.

One difference from the first embodiment is that the collector-plate holder member 10 defines a hole 10a having the same shape as the hole 65 of the cell connecting plate member 6 with respect to the stacking direction of the cell layer nC. Another difference is that the inner gas flow passage I used as the inner cell gas supply passage Xs is communicated with the inner cell gas supply pipe 17 and the opposed outer gas flow passages O used as the inner cell gas exhaust passages Xe are communicated respectively with the respective inner cell gas exhaust pipes 18.

Accordingly, the inner cell gas supplied from the inner cell gas supply pipe 17 to the inner cell supply gas passage Xs flows through the respective inner cell flow passages x of the cells C of the respective cell layers nC to the opposed inner cell gas exhaust passages Xe robe exhausted through the respective inner cell gas exhaust pipes 18.

Third Embodiment

A third embodiment of the invention will be described next with reference to FIGS. 10 through 12.

Each cell C used in this embodiment has the identical construction as those used in the first embodiment. Therefore, no description will be repeated on this.

Figure 10:
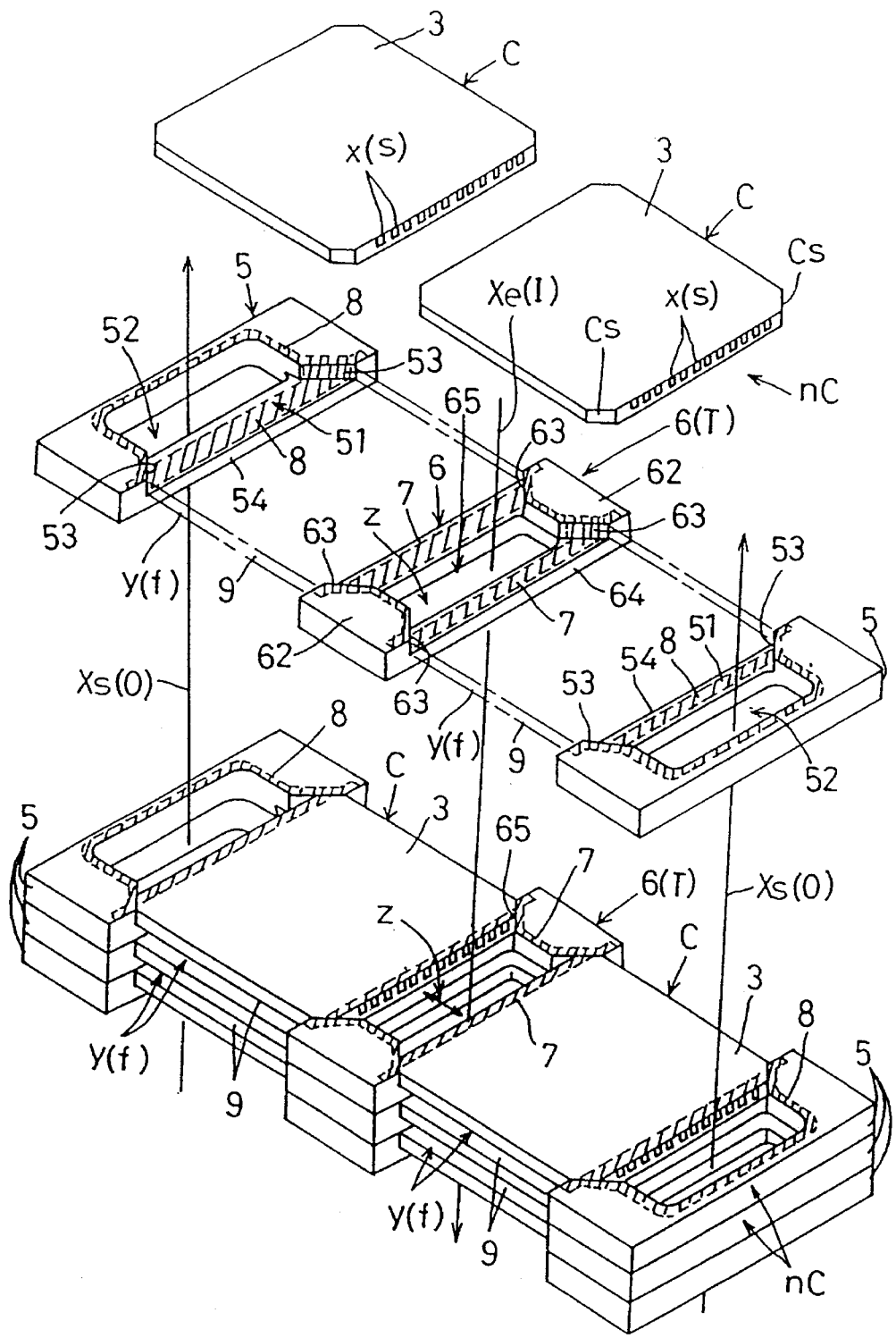
FIG. 10 is an exploded perspective view illustrating a stacking structure of a cell assembly according to a third embodiment.

As shown in FIG. 10, by means of the same stacking structure as the second embodiment, adjacent cells C of each cell layer nC and a plurality of cell layers nC are disposed one above another with a predetermined vertical distance therebetween, thereby to constitute together a multi-layered cell assembly NC.

In this embodiment, however, the inner cell gas flow passage I is used as the inner cell gas exhaust passage Xe, whereas the opposed outer gas flow passages O are used as the inner cell gas supply passages Xs, respectively.

Figure 11:
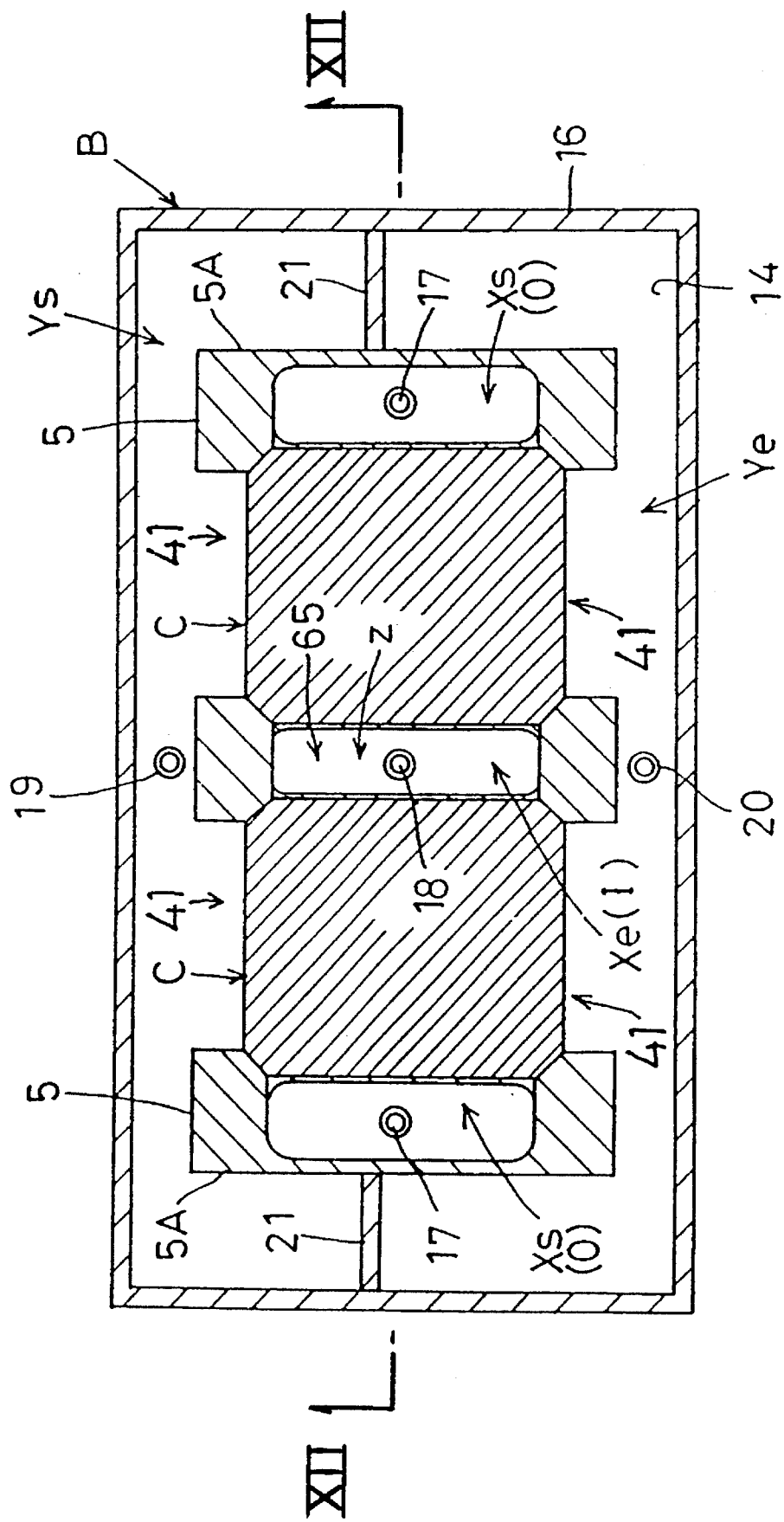
FIG. 11 is a plane view in horizontal section showing an entire construction of a fuel cell according to the third embodiment.
Figure 12:
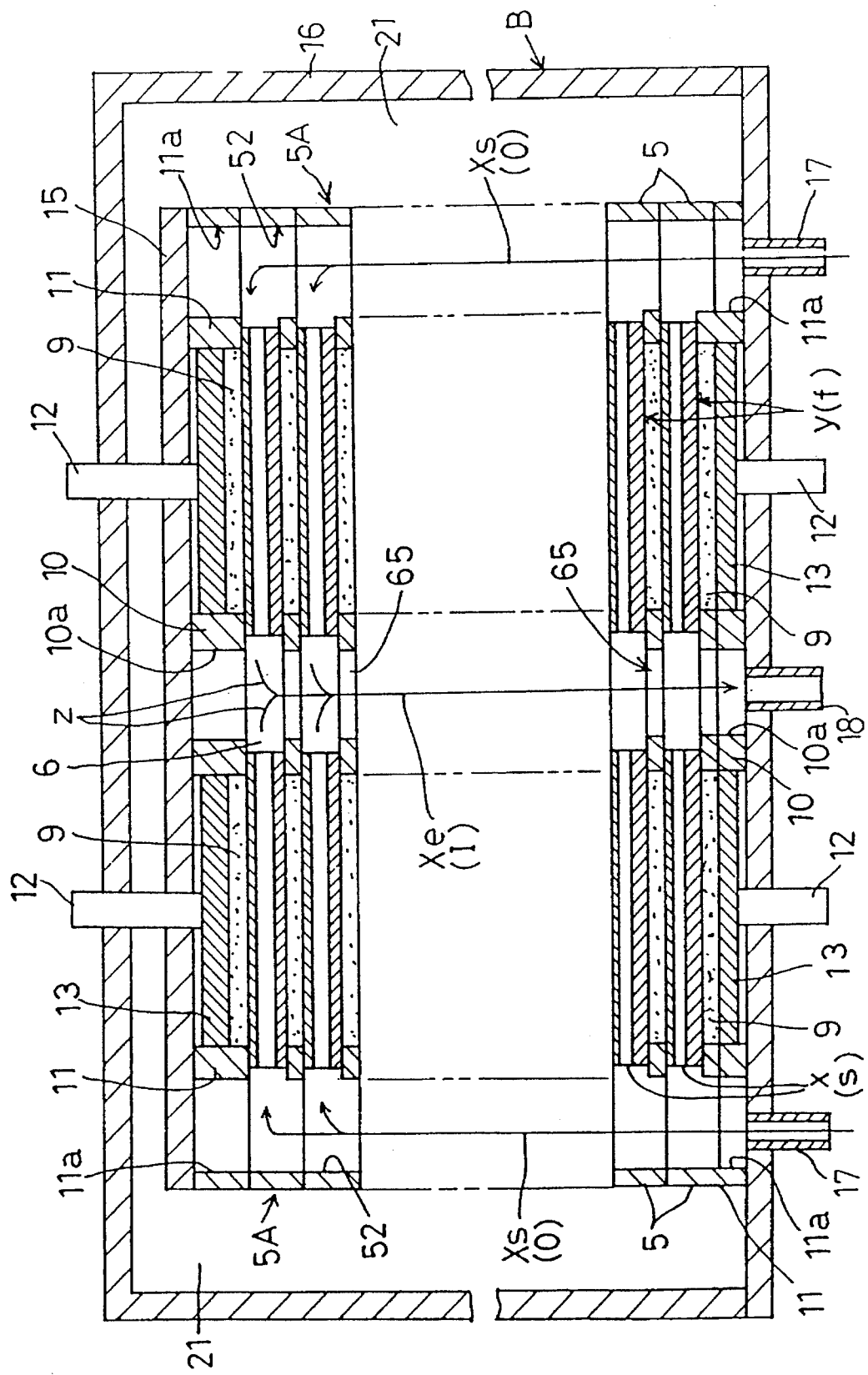
FIG. 12 is a section taken along a line XII—XII in FIG. 11.

As shown in FIGS. 11 through 12, except a respect described infra, the construction of the fuel cell of this embodiment is identical to that of the second embodiment.

The difference from the first embodiment is that the inner gas flow passage I used as the inner cell gas exhaust passage Xe is communicated with the inner cell gas exhaust pipe 18 and the opposed outer gas flow passages O used as the inner cell gas supply passages Xs are communicated respectively with the respective inner cell gas supply pipes 17.

Accordingly, the inner cell gas supplied into the respective opposed inner cell supply gas passage Xs flows through the respective inner cell flow passages x of the cells C of the respective cell layers nC to the inner cell gas exhaust passage Xe.

Fourth Embodiment

A fourth embodiment of the invention will be described next with reference to FIGS. 13 through 16.

Each cell C used in this embodiment has the identical construction as those used in the first embodiment. Therefore, no description will be repeated on this.

Figure 13:
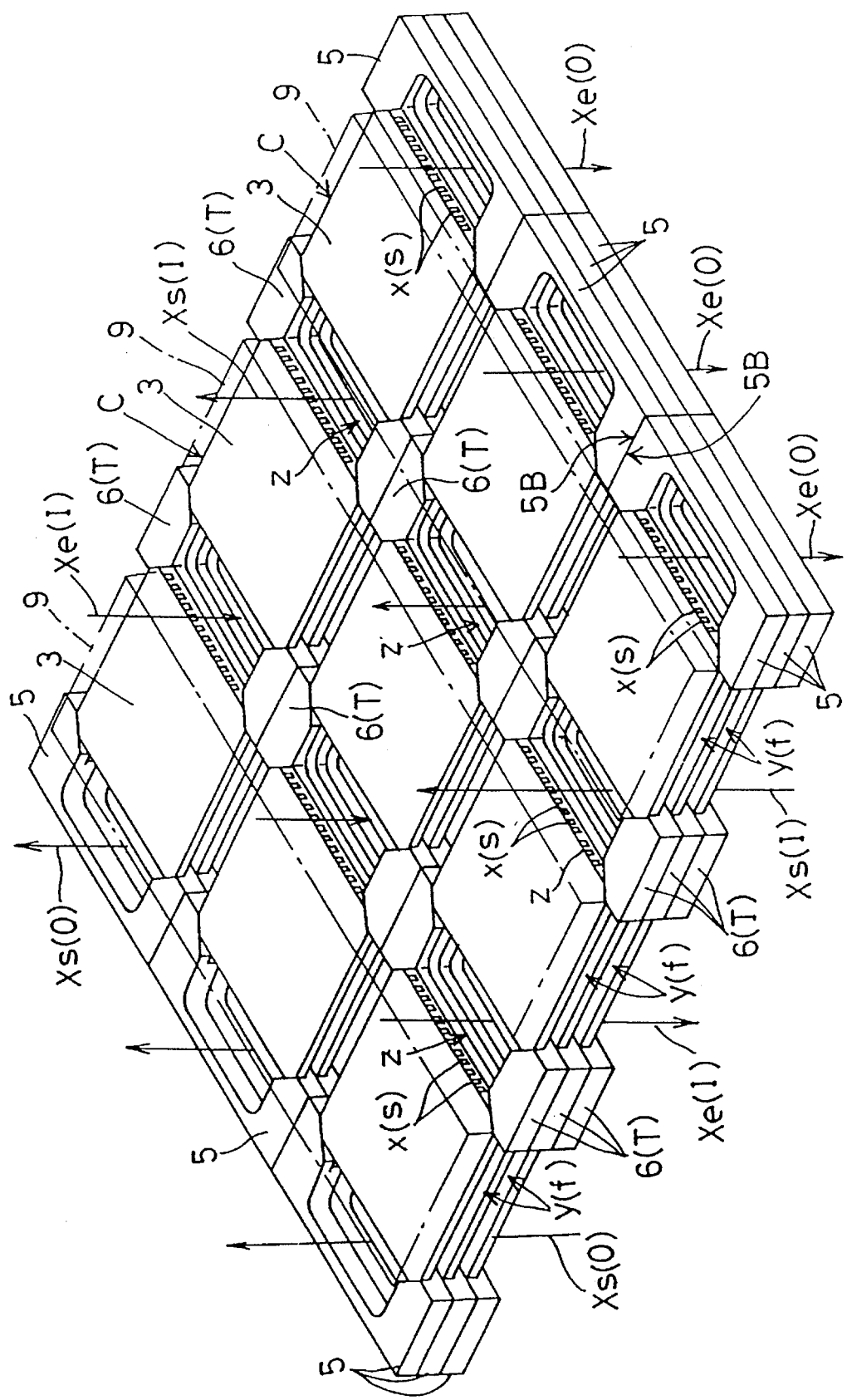
FIG. 13 is an exploded perspective view illustrating a stacking structure of a cell assembly according to a fourth embodiment.

Next, with reference to FIG. 13, description will be made on a multi-layered stacking structure of the cell assembly NC where adjacent cells C are connected in a cell layer nC and a plurality of the cell layers nC are stacked one above another with a predetermined distance therebetween.

Three cells C are juxtaposed side by side in the direction of the plane of the cell C with orienting the respective opened sides 40b thereof in opposition to each other, and the cell holder members 5 are disposed at the respective distal ends of the cells in the juxtaposing direction thereof. Further, the cell connecting plate member 6 having the through hole 65 is interposed between adjacent cells, thereby to complete one cell layer nC. And, a plurality of the cell layers nC constructed in the manner described supra are stacked one above another, thereby to constitute together a cell assembly NC.

Incidentally. though not shown, the sealing members 7 and 8 are provided in the assembly in the same manner as described in the first embodiment.

In this cell assembly NC, two inner gas flow passages I are formed. Then, one of these inner gas flow passages I is used as an inner cell gas supply passage Xs, and the other is used as an inner cell gas exhaust passage Xe. Further, of the two opposed outer gas passages O, the one adjacent the one inner gas flow passage I used as the inner cell gas supply passage Xs is used as an inner cell gas exhaust passage Xe, and the other adjacent the other inner gas flow passage I used as the inner cell gas exhaust passage Xe is used as an inner cell gas supply passage Xs, respectively.

Then, three cell assemblies NC each having the above-described structure are juxtaposed to each other with the opened sides 41 thereof being oriented in opposition to each other. Incidentally, in juxtaposing three cell assemblies NC, the opposing wall faces 5B formed by the end faces of the stacked cell holder members 5 are placed in sealed contact with each other, and the opposing wall faces 6B formed by the end faces of the stacked cell connecting plate members 6 are placed in sealed contact with each other, respectively. Further, a sealing member is interposed between the opposing wall faces 5B so as to maintain the gas tight condition.

A single sheet of soft conductive member 9 is disposed throughout within the three inter-cell flow passages y juxtaposed on the same plane along the juxtaposing direction of the cell assemblies NC.

Figure 14:
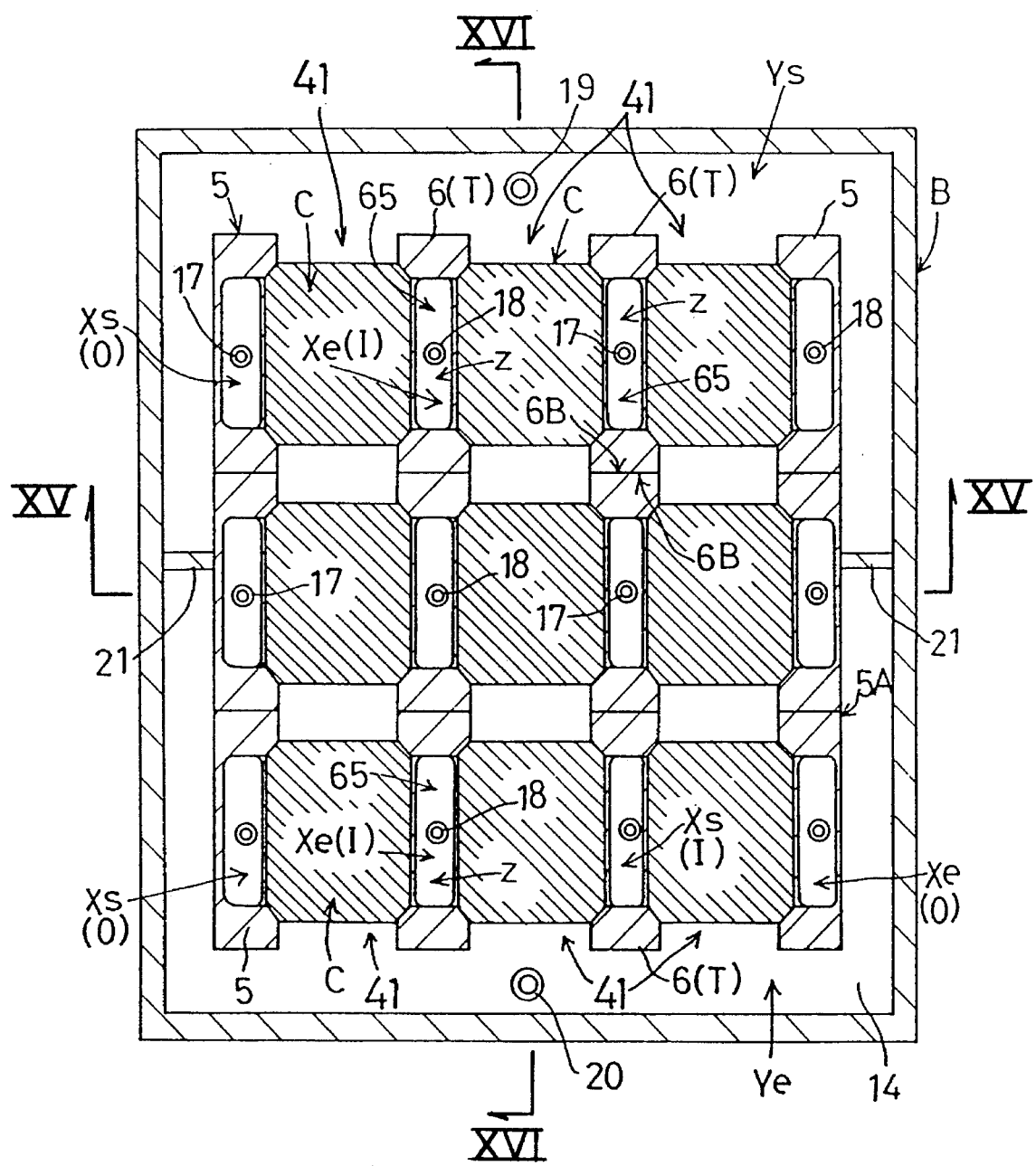
FIG. 14 is a plane view in horizontal section showing an entire construction of a fuel cell according to the fourth embodiment.
Figure 15:
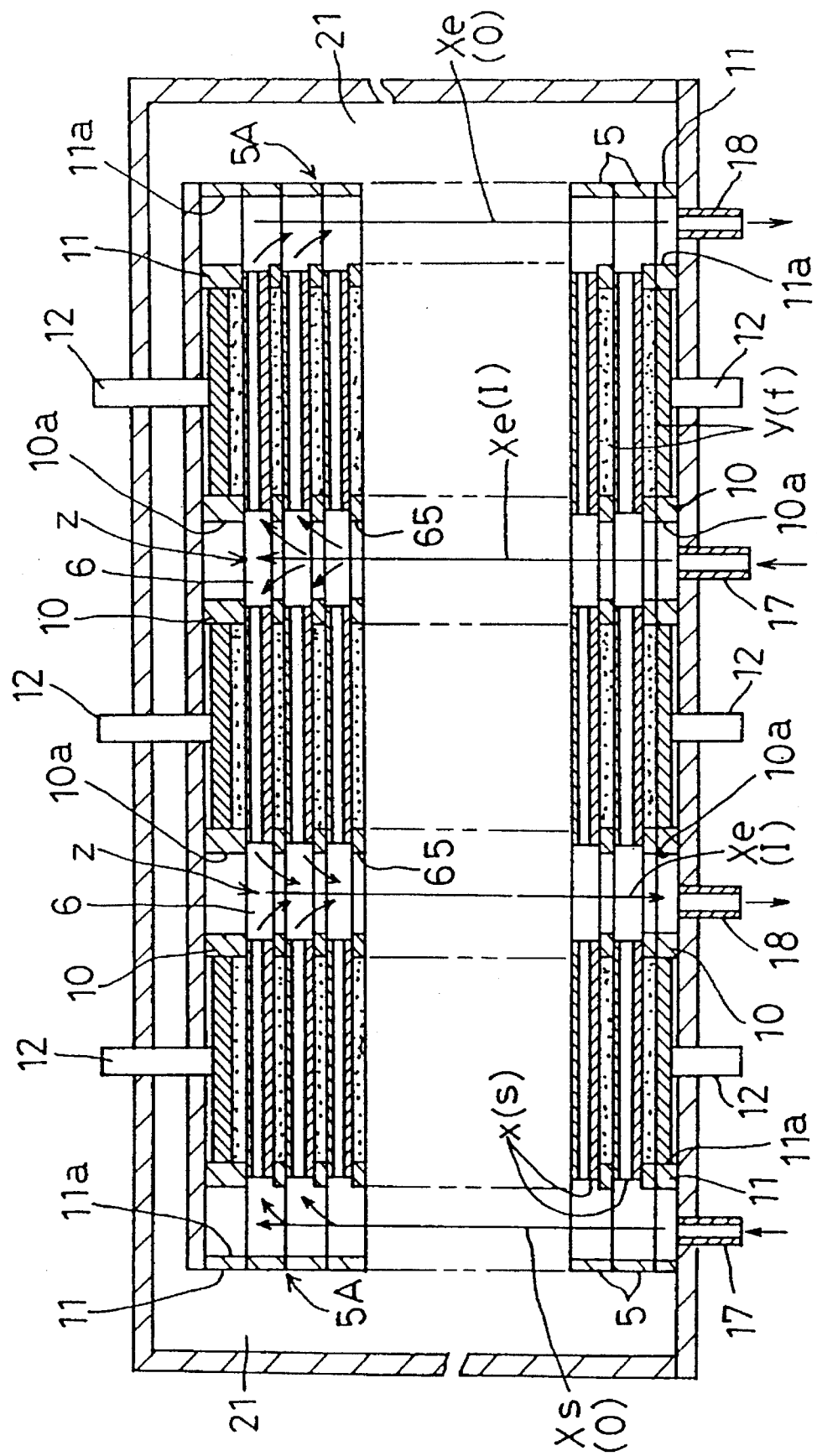
FIG. 15 is a section taken along a line XV—XV in FIG. 14.
Figure 16:
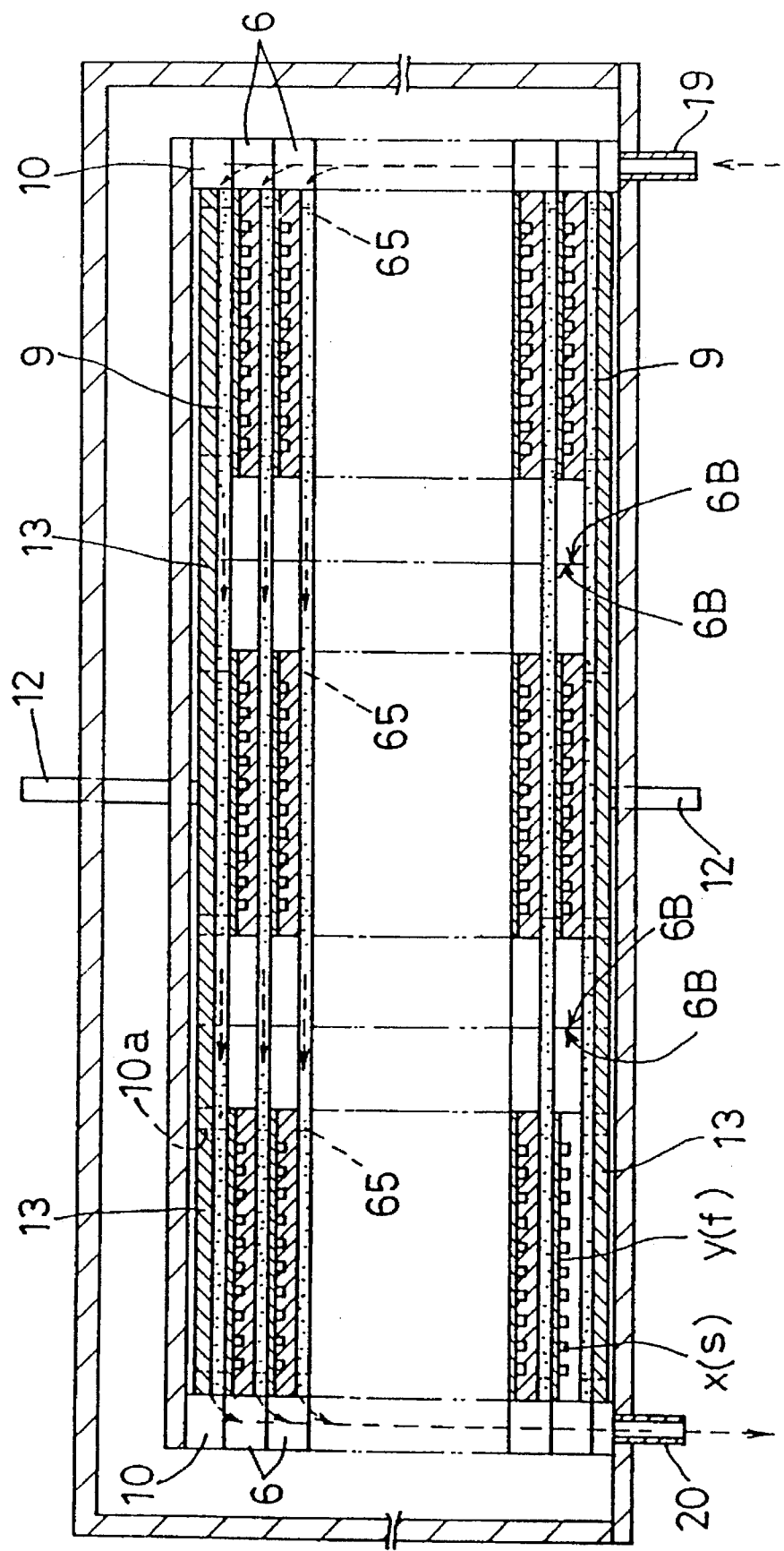
FIG. 16 is a section taken along a line XVI—XVI in FIG. 14.

Next, the overall construction of the fuel cell will be described with reference to FIGS. 14 through 16.

At each of the opposed terminal ends of the cell assemblies NC with respect to the stacking direction, collector-plate holder members 10, 11 are provided in the same manner as the second embodiment.

Between the collector-plate holder member 10 and the other collector-plate holder member 11 and also between the two collector-plate holder members 10, a single sheet of collector plate 13, to which terminal bar elements 12 are fixed, is interposed so as to contact with the soft conductive member 9.

Then, the entire assembly of the three juxtaposed cell assemblies NC is accommodated within a box member B as in the first embodiment. And, the interior of this box member B is partitioned into two sections. Accordingly, one of these two sections is used as an inter-cell gas supply passage Ys for supplying the inter-cell gas to the respective inter-cell flow passages Y, while the other section is used as an inter-cell gas exhaust passage Ye for exhausting the inter-cell gas from the respective inter-cell flow passages y, respectively.

The respective inner gas flow passages I used as the inner cell gas supply passages Xs are communicated with inner cell gas supply pipes 17, and the other inner gas flow passage I used as the inner cell gas exhaust passages Xe are communicated with inner cell gas exhaust pipes 18. Further, the outer gas flow passages O used as the inner cell gas supply passages Xs are communicated with respective the inner cell gas supply pipes 17, and the other outer gas flow passages O used as the inner cell gas exhaust passages Xe are communicated with the inner cell gas exhaust pipes 18, respectively. Further, the inter-cell gas supply passage Ys is communicated with the inter-cell gas supply pipe 19, and the inter-cell gas exhaust passage Ye is communicated with the inter-cell gas exhaust pipe 20.

Accordingly, the inner cell gas introduced into the inner flow passage I as the inner cell gas supply passage Xs flows through the respective inner cell flow passages x of the cells C of the respective cell layers nC into the inner flow passage I and outer flow passage O acting as the opposed inner cell gas exhaust passages Xe. Also, the inner cell gas introduced into the outer flow passage O acting as the inner cell gas supply passage Xs flows through the respective inner cell flow passages x of the cells C of the respective cell layer nC into the inner flow passage I acting as the inner cell gas exhaust passage Xe.

On the other hand, the inter-cell gas introduced into the inter-cell gas supply passage Ys flows through the respective inter-cell flow passages y and then flows into the inter-cell gas exhaust passage Ye to be exhausted therefrom.

Fifth Embodiment

A fifth embodiment of the invention will be described next with reference to FIGS. 17 through 20.

Each cell C used in this embodiment has the identical construction as those used in the first embodiment. Therefore, no description will be repeated on this.

Figure 17:
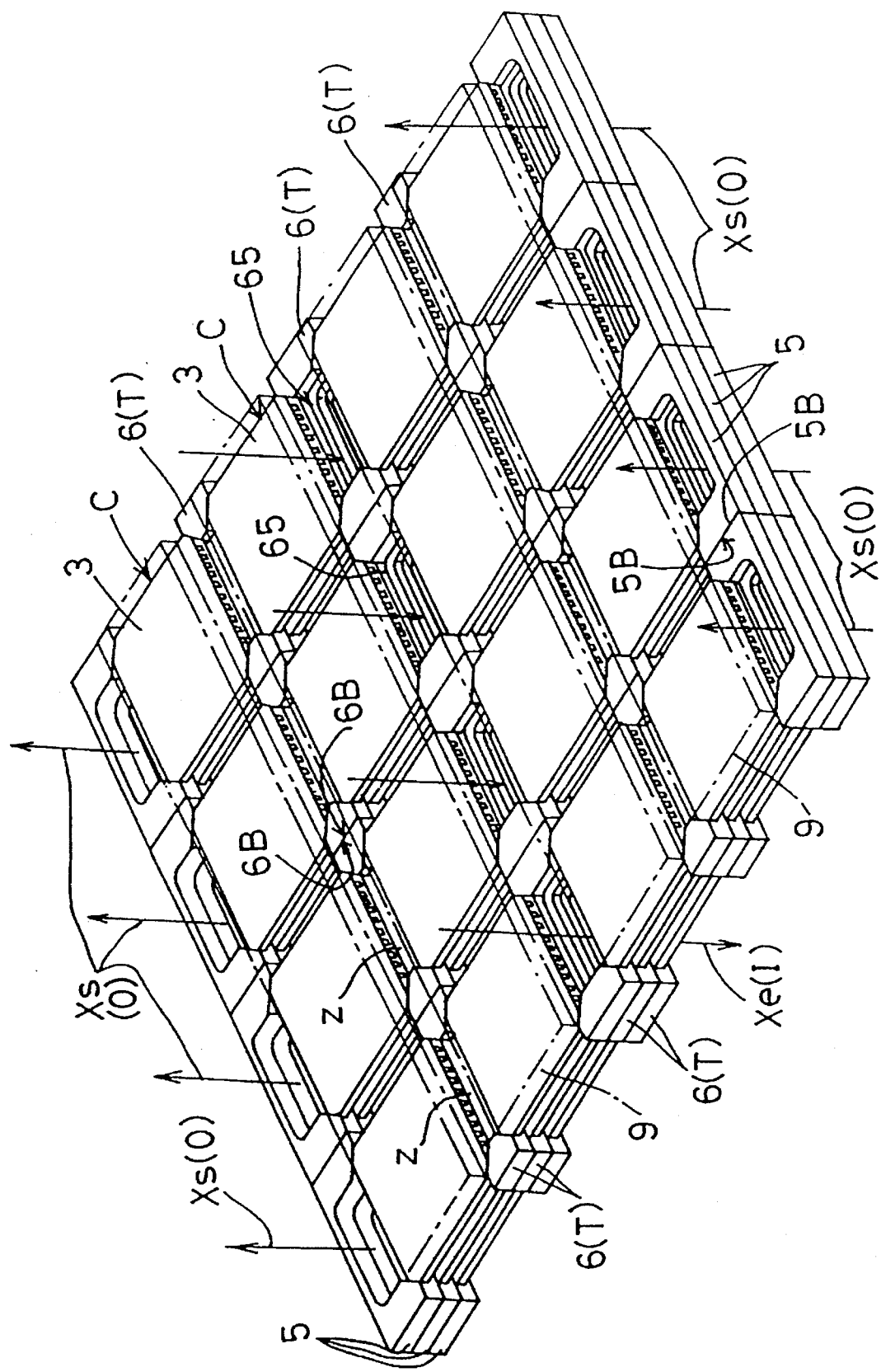
FIG. 17 is an exploded perspective view illustrating a stacking structure of a cell assembly according to a fifth embodiment.

Next, with reference to FIG. 17, description will be made on a multi-layered stacking structure of the cell assembly NC where adjacent cells C are connected in a cell layer nC and a plurality of the cell layers nC are stacked one above another with a predetermined distance therebetween.

Four cells C are juxtaposed side by side in the direction of the plane of the cell C with orienting the respective opened sides 40b thereof in opposition to each other, and the cell holder members 5 are disposed at the respective distal ends of the cells in the juxtaposing direction thereof. Further, the cell connecting plate member 6 having the through hole 65 is interposed between each adjacent cells in the center of the cell layer nC, thereby to complete one cell layer nC. And, a plurality of the cell layers nC constructed in the manner described supra are stacked one above another, thereby to constitute together a cell assembly NC, Incidentally, though not shown, the sealing members 7 and 8 are provided in the assembly in the same manner as described in the first embodiment.

In this cell assembly NC, the inner gas flow passage I is used as an inner cell gas exhaust passage Xe, and the two opposed outer gas passages O are used as the inner cell gas supply passages Xs, respectively.

Then, four cell assemblies NC each having the above-described structure are juxtaposed to each other with the opened sides 41 thereof being oriented in opposition to each other. Incidentally, in juxtaposing four cell assemblies NC, the opposing wall faces 5B formed by the end faces of the stacked cell holder members 5 are placed in sealed contact with each other, and the opposing wall faces 6B formed by the end faces of the stacked cell connecting plate members 6 are placed in sealed contact with each other, respectively. Further, a sealing member is interposed between the opposing wall faces 5B so as to maintain the gas tight condition.

A single sheet of soft conductive member 9 is disposed throughout within the four inter-cell flow passages y juxtaposed on the same plane along the juxtaposing direction of the cell assemblies NC.

Figure 18:
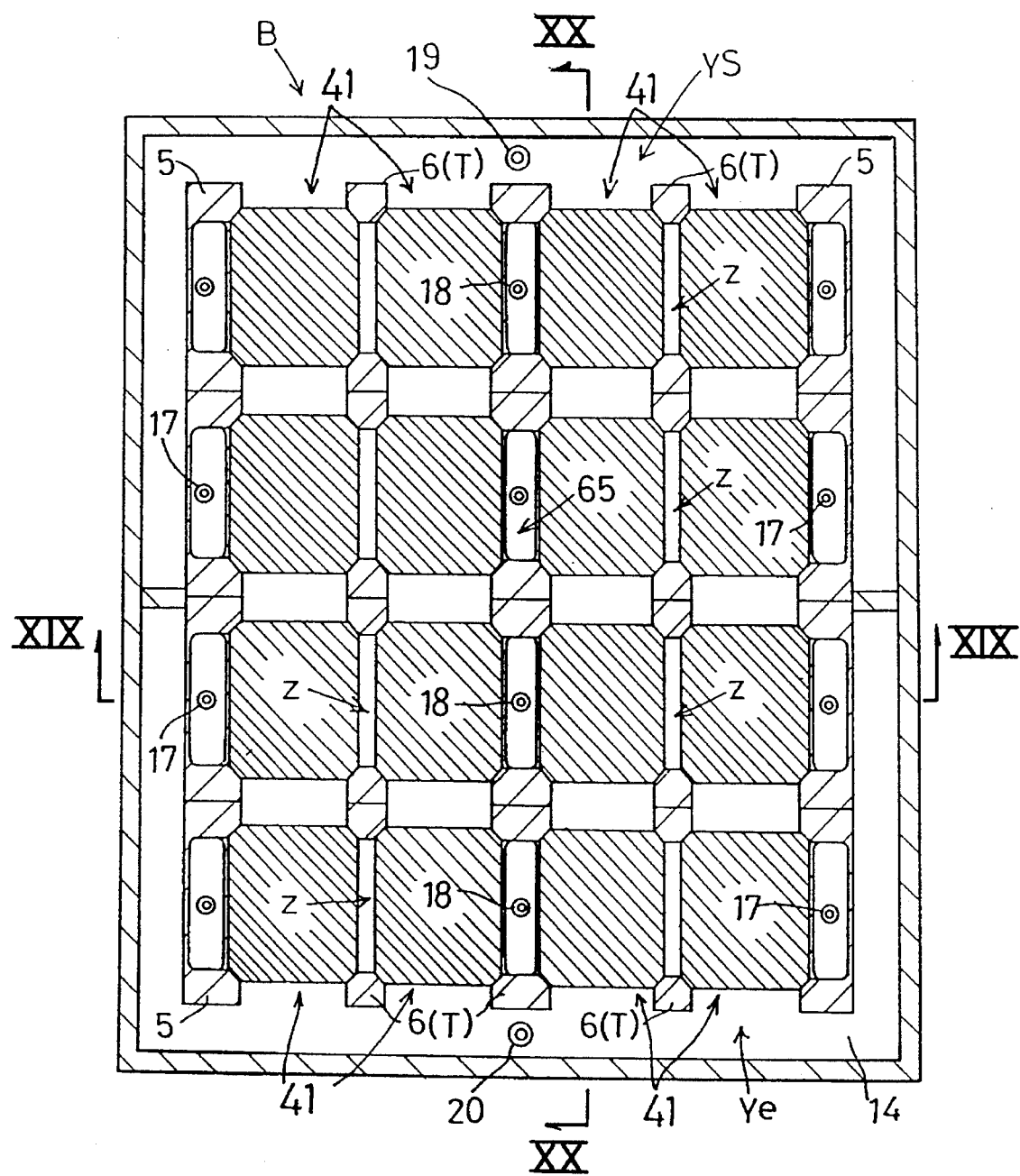
FIG. 18 is a plane view in horizontal section showing an entire construction of a fuel cell according to the fifth embodiment.
Figure 19:
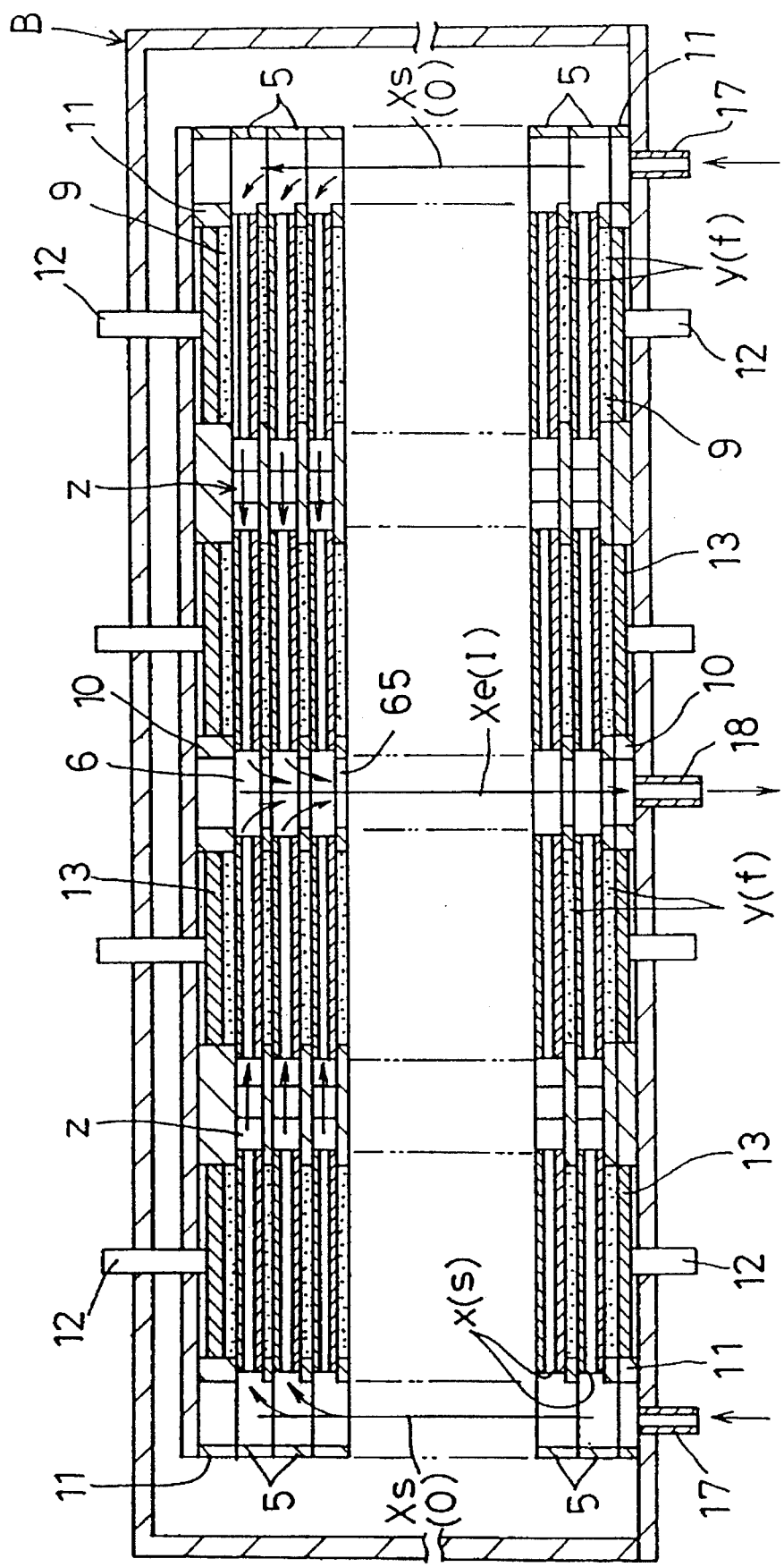
FIG. 19 is a section taken along a line XIX—XIX in FIG. 18.
Figure 20:
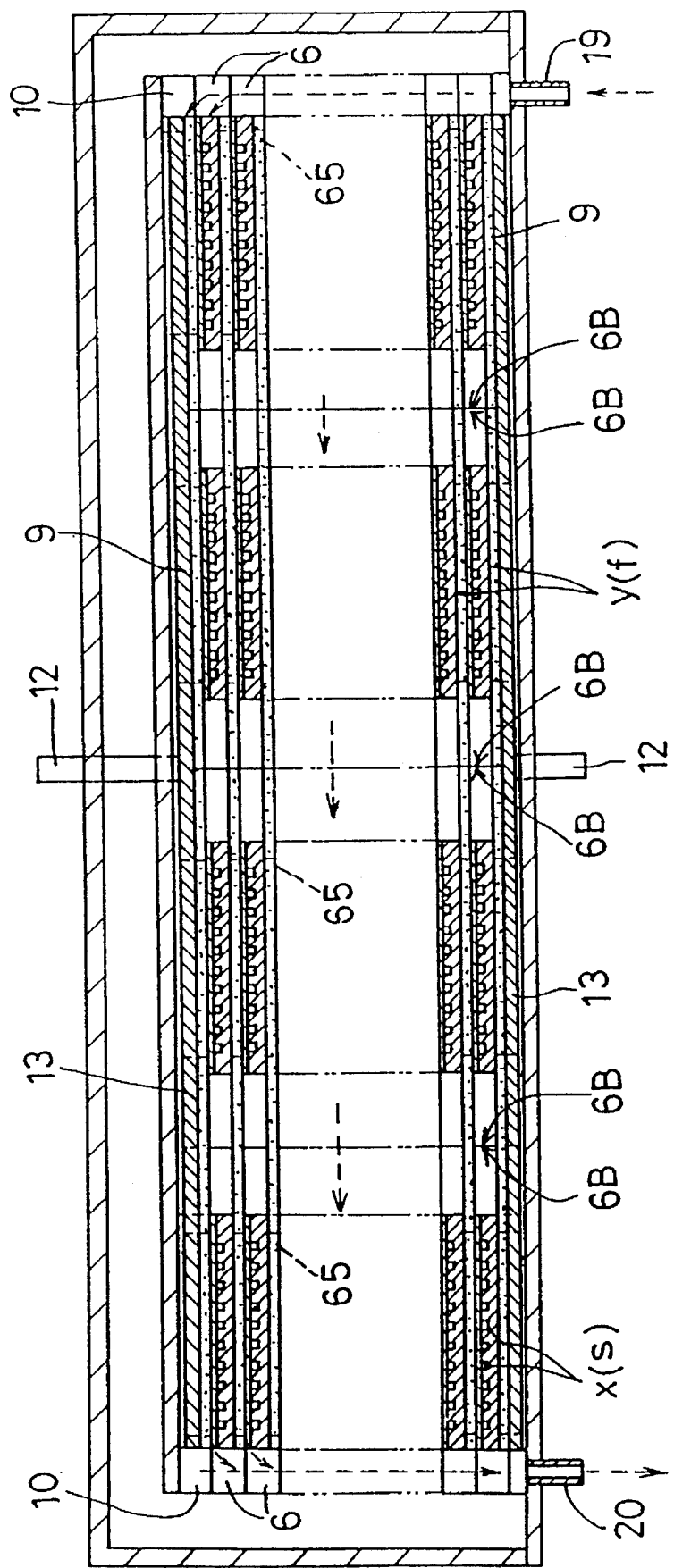
FIG. 20 is a section taken along a line XX—XX in FIG. 18.

Next, the overall construction of the fuel cell will be described with reference to FIGS. 18 through 20.

At each of the opposed terminal ends of the cell assemblies NC with respect to the stacking direction, collector-plate holder members 10, 11 are provided in the same manner as the first and second embodiments. Between the collector-plate holder member 10 and the other collector-plate holder member 11 and also between the two collector-plate holder members 10, a single sheet of collector plate 13, to which terminal bar elements 12 are fixed, is interposed so as to contact with the soft conductive member 9.

Then, the entire assembly of the four juxtaposed cell assemblies NC is accommodated within a box member B as in the first embodiment. And, the interior of this box member B is partitioned into two sections by a pair of partition wall members 21. Accordingly, one of these two sections is used as an inter-cell gas supply passage Ys for supplying the gas to the respective inter-cell flow passages Y, while the other section is used as an inter-cell gas exhaust passage Ye for exhausting the gas from the respective inter-cell flow passages y, respectively.

The respective inner gas flow passages I used as the inner cell gas supply passages Xs are communicated with inner cell gas supply pipes 17, and the other inner gas flow passages I used as the inner cell gas exhaust passages Xe are communicated with inner cell gas exhaust pipes 18. Further, the outer gas flow passages O used as the inner cell gas supply passages Xs are communicated with respective the inner cell gas supply pipes 17, and the other outer gas flow passages O used as the inner cell gas exhaust passages Xe are communicated with the inner cell gas exhaust pipes 18, respectively. Further, the inter-cell gas supply passage Ys is communicated with the inter-cell gas supply pipe 19, and the inter-cell gas exhaust passage Ye is communicated with the inter-cell gas exhaust pipe 20.

Accordingly, in each cell assembly NC, the inner cell gas introduced into the outer gas flow passages O as the opposed inner cell gas supply passages Xs flows through the respective inner cell flow passages x of the cells C of the respective cell layers nC to the inner flow passage I as the inner cell gas exhaust passage Xe via the connecting flow passage z and flows into the inner flow passage I as the inner cell gas exhaust passage Xe.

On the other hand, the inter-cell gas introduced into the inter-cell gas supply passage Ys flows through the respective inter-cell flow passages y and then flows into the inter-cell gas exhaust passage Ye to be exhausted therefrom.

Sixth Embodiment sixth embodiment of the invention will be described next with reference to FIGS. 21 through 24.

Each cell C used in this embodiment has the identical construction as those used in the first embodiment. Therefore, no description will be repeated on this.

Figure 21:
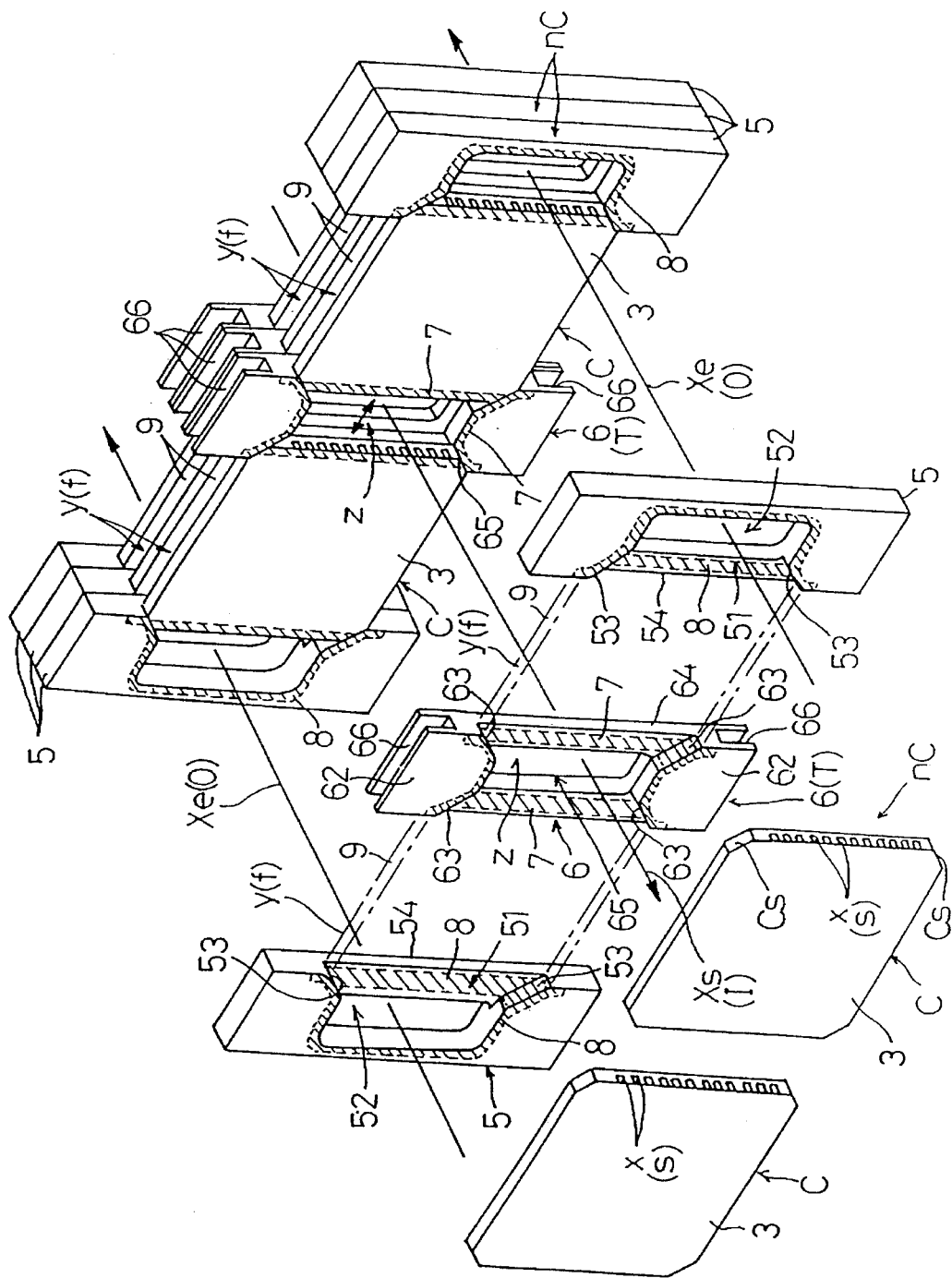
FIG. 21 is an exploded perspective view illustrating a stacking structure of a cell assembly according to a sixth embodiment.

Next, with reference to FIG. 21, description will be made on a multi-layered stacking structure of the cell assembly NC where adjacent cells C are connected in a cell layer nC and a plurality of the cell layers nC are stacked one above another with a predetermined distance therebetween.

The cell holder member 5 has the identical construction to the one used in the second embodiment. Further, the cell connecting plate member 6 is identical to the one used in the second embodiment, except for the fact that in the case of the cell connecting plate member 6 of this embodiment, each of the opposed partition wall portions 62 defines a cutout portion 66 extending from one edge to the other opposing edge of the wall portion. This cutout portion 62 is formed in parallel with the connecting flow passage z or the juxtaposing direction of the cells C.

To the respective opposed ends of the cutout portion 61 of the cell connecting plate member 6, the opened sides 40a of the two adjacent cells C are introduced, such that the closed sides 40c respectively adjacent the opposed opened sides 40a are placed into sealed contact with the abutment faces 63 and also that the closed sides 40c adjacent the other opened sides 40a of these cells C are placed into sealed contact with the abutment faces 58, thereby to form one cell layer nC. Then, a base mount (not shown) used for assembling the cell assembly is placed with an upper face thereof oriented in the horizontal direction. Thereafter, a plurality of cell layers nC are 'stacked' one after another in the horizontal direction on the base mount, with the plane of the cell C being oriented in the vertical direction, whereby a cell assembly NC is constructed.

In this assembled condition, the adjacent cells C of each cell layer nC are supported by thin portions 64 of the cell connecting plate member 6, and the same thin portions 64 also support the cells disposed adjacent each other in the stacking direction of the cell layers nC with a predetermined distance therebetween.

As the thin portion 54 of the cell holder member 5 and the thin portion 64 of the cell connecting plate member 6 partition between the cell faces of the adjacent cells of the stacked cell layers nC, an inter-cell flow passage y is formed between these cells adjacent each other with respect to the stacking direction of the cell layers nC. This inter-cell flow passage y is closed on the opposed opened sides of the cell C and is opened on the closed sides of the same. Further, this inter-cell flow passage y is exposed to the fuel electrode 3 and functions as a fuel flow passage f for circulating a fuel gas containing hydrogen.

Incidentally, when the opened side 40a of the cell C is fitted to the cutout portion 61 of the cell connecting plate member 6, this opened side 40a of the cell C is pressed against the cell connecting plate member 6 so as to bring the inclined portions of the opposed closed sides 40c of the cell C into sealed contact with the respective abutment faces 63. Similarly, when the opened side 40a of the cell C is fitted to the cutout portion 51 of the cell holder member 5, the cell holder member 5 is pressed against the opened side 40a of the cell Cs so as to bring the inclined portions Cs of the opposed closed sides 40c of the cell C into sealed contact with the respective abutment faces 53.

As the cutout portion 61 of the cell connecting plate member 6 is partitioned by the partition wall portions 62 on the opposed sides of this cutout portion 61 and also by a further cell connecting plate member 6 adjacent said cell connecting plate member 6, there is formed a connecting flow passage z which interconnects the inner cell flow passages x of the adjacent cells C of one common cell layer nC and which also partitions and seals the inner cell flow passages x and the inter-cell flow passage y from each other. As denoted by a phantom line in FIG. 21, this gas tight sealed condition is maintained by means of a heat-resistant and electrically insulating sealing member 7 which is disposed among a periphery of the opened side 40b of the cell to which the inner cell flow passages x are opened, the thin portions 64 and the pair of abutment faces 63 of the cell connecting plate member 6 in which the cell C is introduced, and the back face of the adjacent cell connecting plate member 6. As also indicated by the phantom line in FIG. 21, the sealing member 7 is also provided between the cell connecting plate members 6 which are disposed adjacent with respect to the stacking direction of the cell layers nC, so as to maintain the sealed condition between the connecting flow passage z and the outside.

Further, as the thin portions 54 and the pair of abutment faces 53 of the cell holder member 5 in which the cell C is inserted and the back face of the adjacent cell holder member 5 are placed in sealed contact with the periphery of the opened side 40b of the cell C to which the inner cell flow passages x are opened, the inner cell flow passages x and the inter-cell cell flow passage y are partitioned and sealed from each other. As denoted by a phantom line in FIG. 21, this sealed condition is maintained by means of a further sealing member 8 which is similar to the sealing member 7 and which is disposed among the periphery of the opened side 40b of the cell C, the thin portion 54 and the pair of abutment faces 53 of the cell holder member 5 in which the cell C is mounted, and the back face of the adjacent cell holder member 5.

In the cell assembly NC, adjacent each of the opposed end faces of the assembly where the terminal ends of the cell layers nC in the cell juxtaposing direction are located, one flow passage which extends continuously in the stacking direction of the cell layers nC is formed by means of the respective through holes 52 of the stacked cell holder members 5. And, these two flow passages are used as outer gas flow passages O communicated with the inner cell flow passages x of the respective cells C disposed in the stacking direction of the cell layers nC. Incidentally, as indicated by a phantom line in FIG. 21, the sealing member 8 is provided also between the cell holder members 6 adjacently disposed with respect to the stacking direction of the cell layers nC, so as to maintain the sealed condition between the outer gas flow passages O and the outside.

Then, the respective through holes 65 of the cell connecting plate members 6 together form an inner gas flow passage I which continuously interconnects the connecting flow passages z of the respective cell layers nC in the stacking direction of the cell layers nC. And, this inner gas flow passage I is used as an inner cell gas supply passage Xs, while the opposed outer gas flow passages O are used as inner cell gas exhaust passages Xe, respectively.

Between the cells adjacent in the cell layer stacking direction, i.e. within the inter-cell flow passage y, the gas-permeable soft conductive member 9 is provided for conductively interconnecting these cells adjacent in the cell layer stacking direction.

Figure 22:
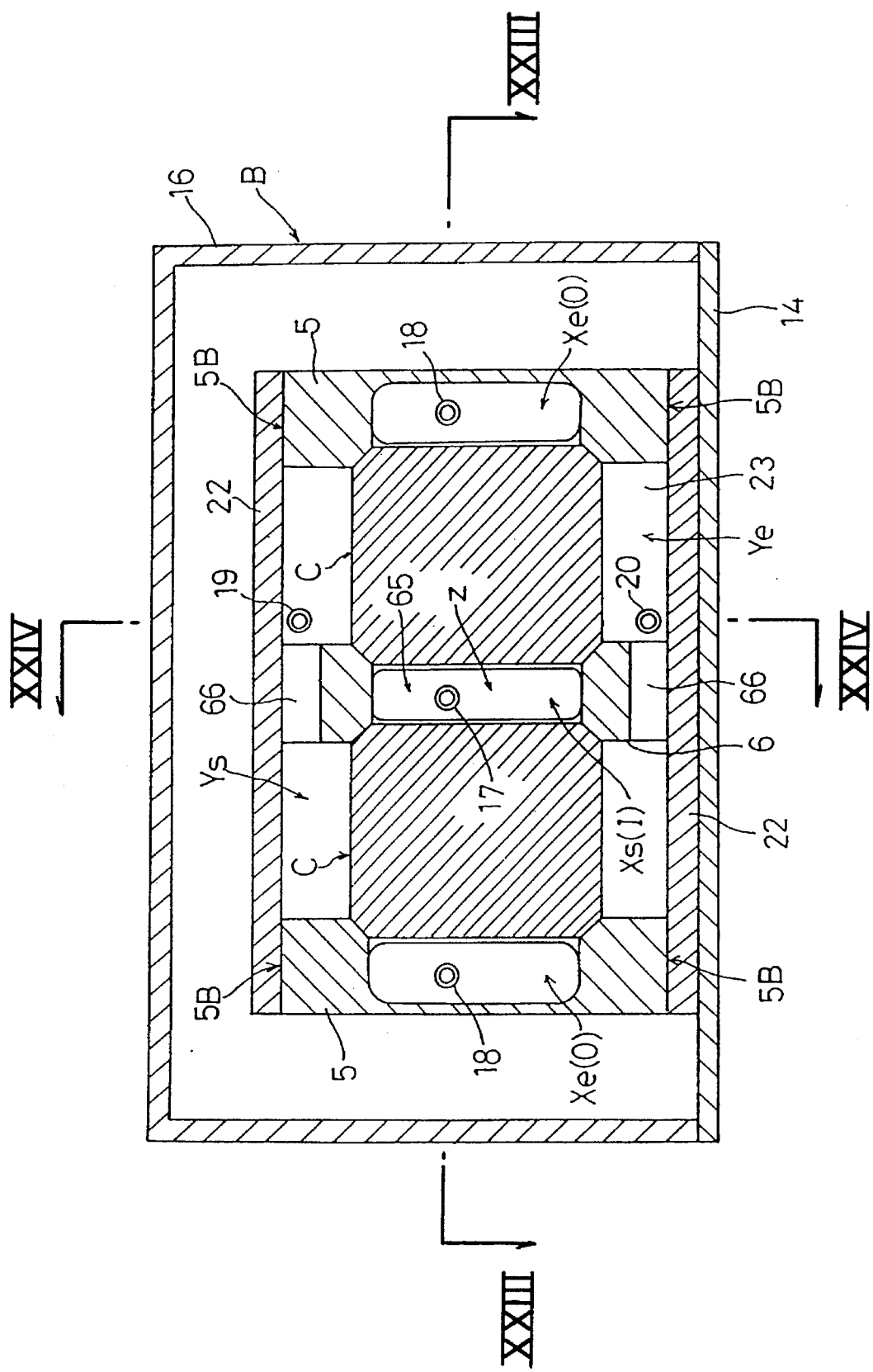
FIG. 22 is a front view in vertical section showing an entire construction of a fuel cell according to the sixth embodiment.
Figure 23:
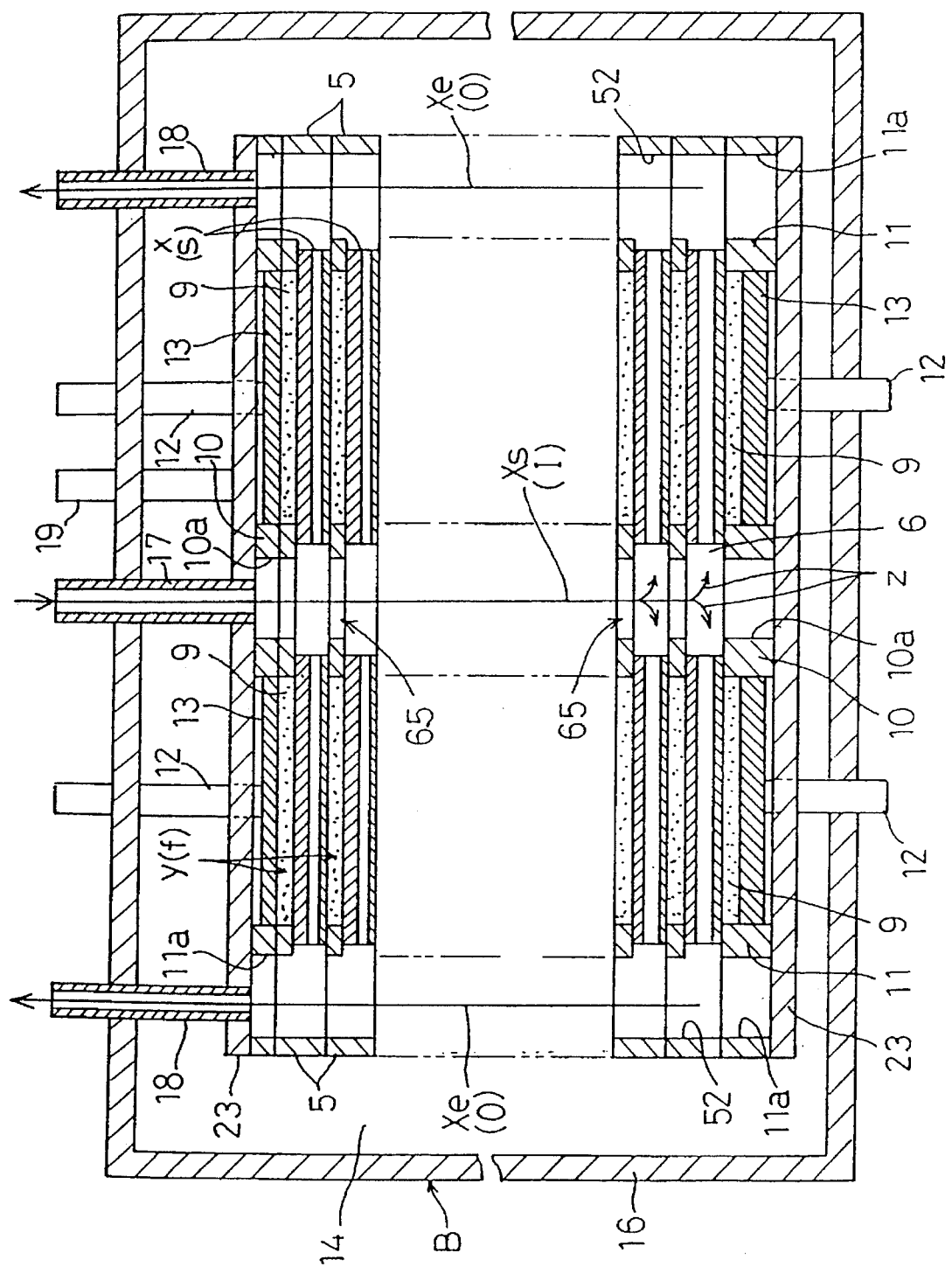
FIG. 23 is a section taken along a line XXIII—XXIII in FIG. 22.
Figure 24:
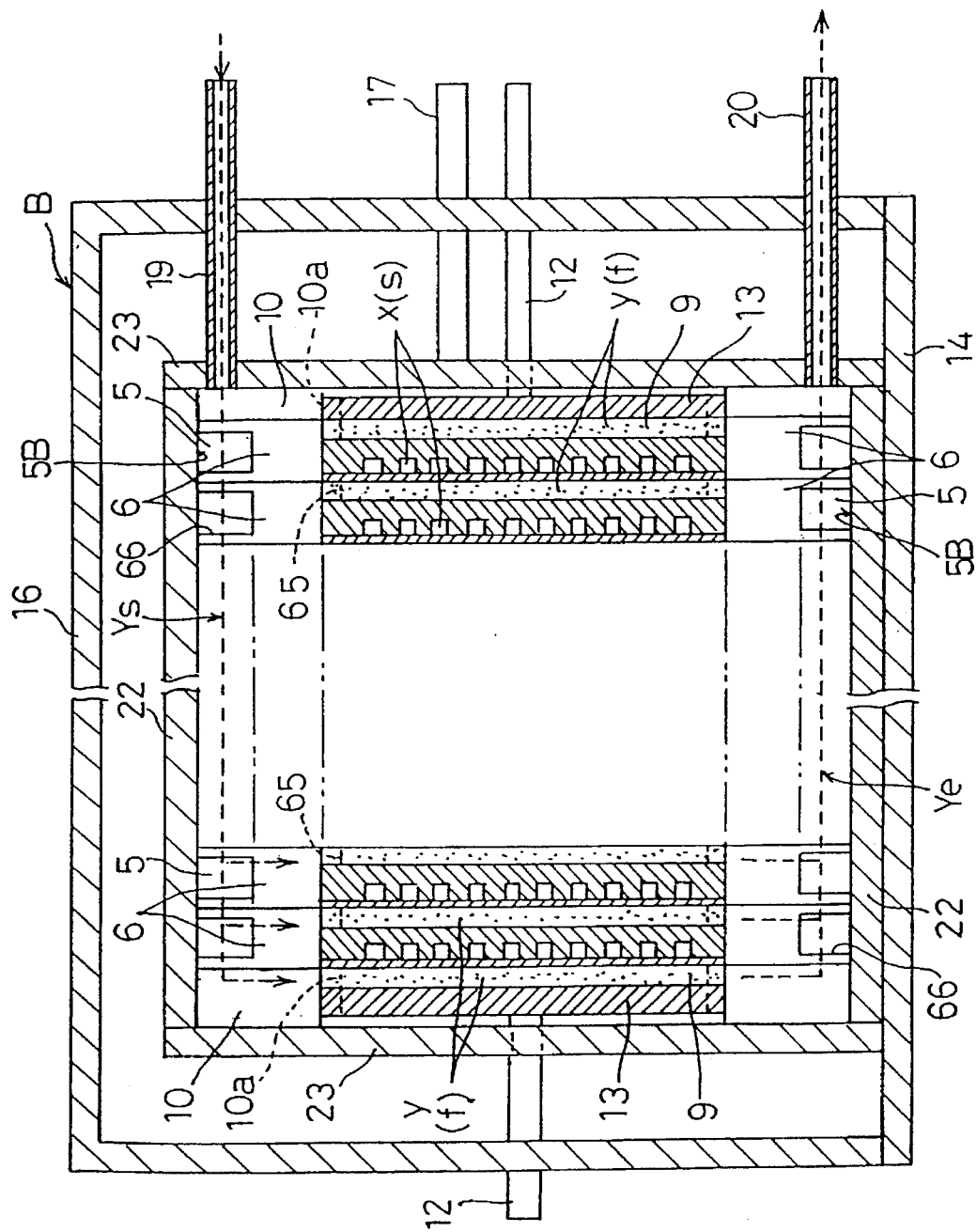
FIG. 24 is a section taken along a line XXIV—XXIV in FIG. 22.
Figure 25:
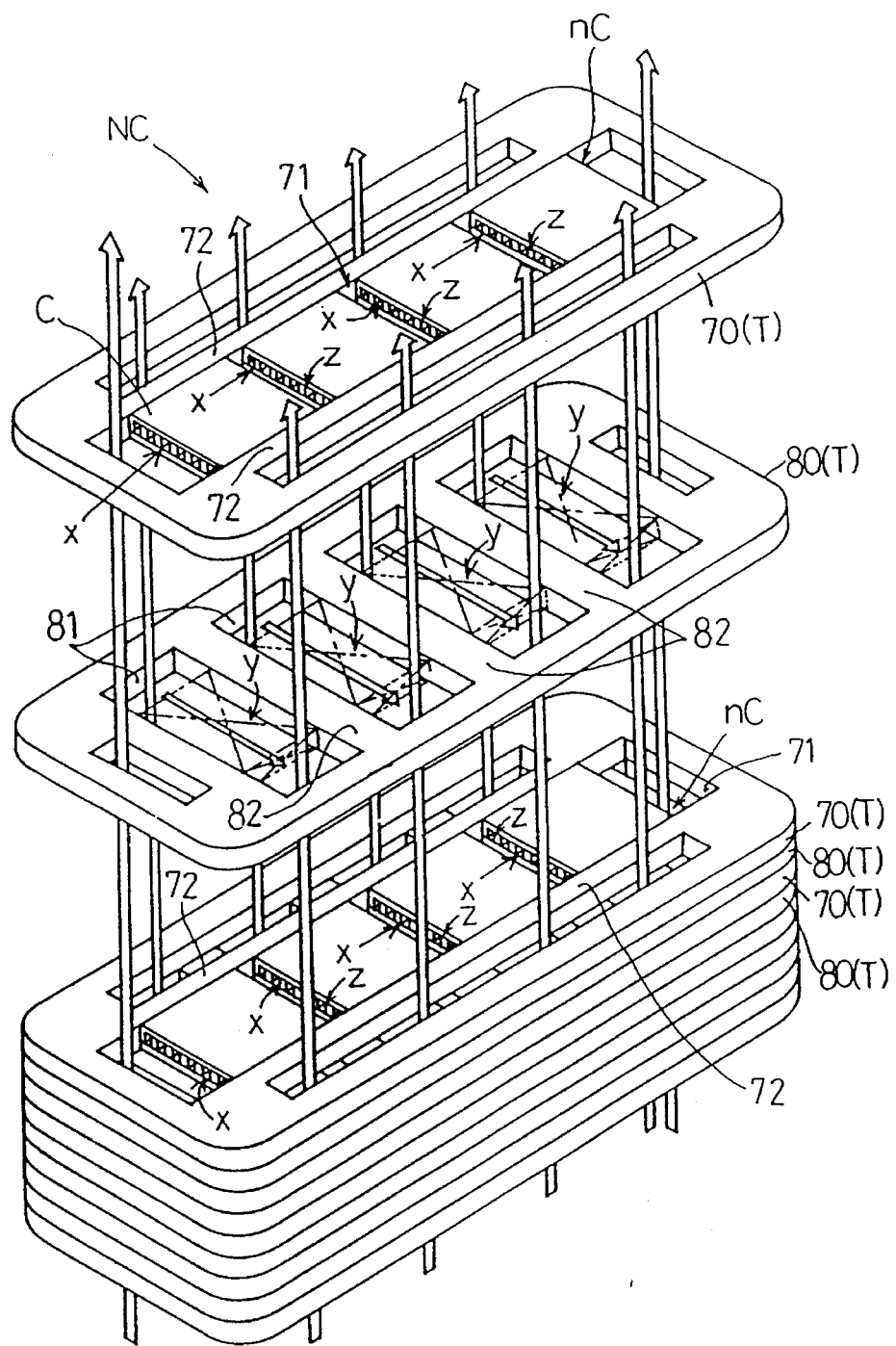
FIG. 25 is a perspective view showing an entire construction of a conventional fuel cell.

Next, the overall construction of the fuel cell will be described with reference to FIGS. 22 through 24.

At each of the opposed terminal ends of the cell assembly NC with respect to the stacking direction, like the second embodiment, a collector-plate holder member 10 is laid on the cell connecting plate member 6 and a further collector-plate holder member 11 is laid on the cell holder member 5.

Between the collector-plate holder member 10 and the other collector-plate holder member 11, the collector plate 13, to which the terminal bar elements 12 are fixed, is interposed so as to contact with the soft conductive member 9, so that an output electric power is obtained from the two terminal bar elements 12.

Further, a partition wall member 22 is provided to cover the opened side 41 of the cell assembly NC, with the wall member 22 being connected with the wall face 5B formed by the end faces of the stacked cell holder members 5 and with the other wall face 5B formed by the other end faces of the stacked cell holder members 5. This partition wall member 22 is provided to each of the opposed pair of opened sides 41 of the cell assembly NC. Then, the space formed between one partition wall member 22 and the opened side 41 of the cell assembly NC is used as the inter-cell gas supply flow passage Ys for supplying the inter-cell gas to the respective inter-cell flow passages Y, while the space formed between the other partition wall member 22 and the opened side 41 of the cell assembly NC is used as the inter-cell gas exhaust passage Ye for exhausting the inter-cell gas from the respective inter-cell flow passages y. Incidentally, via the cutout portions 66 of the cell connecting plate members 6, the inter-cell gas supply passages Ys disposed on the opposed sides (i.e. on the right and left in FIG. 22) are communicated with each other, and also the opposed inter-cell gas exhaust passages Ye are communicated with each other.

Further, a pair of cover members 23 are provided for closing the opposed opened ends of the opposed outer gas flow passages O, the inner gas flow passage I, the inter-cell gas supply passages Ys and the inter-cell gas exhaust passages Ye.

Then, the cell assembly NC having the above-described structure is mounted on the base mount 14 with the stacking direction of the cell layers nC thereof being oriented in the horizontal direction. Further, the angular cylindrical member 16 having a bottom or top and accommodating the cell assembly NC is mounted on the base mount 14. That is, the base mount 14 and the angular cylindrical member together constitute the box member B, in which the cell assembly NC is accommodated.

The inner gas flow passage I used as the inner cell gas supply passage Xs is communicated with an inner cell gas supply pipe 17, and the opposed outer gas flow passages O used as the inner cell gas exhaust passages Xe are communicated with inner cell gas exhaust pipes 18. Further, the inter-cell gas supply passage Ys is communicated with an inter-cell gas supply pipe 19, and the inter-cell gas exhaust passage Ye is communicated with an inter-cell gas exhaust pipe 20, respectively.

Other Embodiments (1) In the foregoing respective embodiments, both of the abutment faces 63 of the cell connecting plate member 6 are formed with the inclination. Instead, only one of them may be formed with such inclination. In this case, it is not necessary to form the inclined portion Cs in the closed side C of the cell C corresponding to this non-inclined abutment face 63. Further, in the foregoing embodiments, both of the pair of abutment faces 53 of the cell holder member 5 are formed with the inclination. Instead, only one of them may be formed with such inclination. In this case, it is not necessary to form the inclined portion Cs in the closed side of the cell C corresponding to this non-inclined abutment face 53.

(2) In the foregoing respective embodiments, the cell C is constructed such that the separator 4 is affixed to the side of the three-layer plate member facing the oxygen electrode 2. Instead, the cell C may be constructed alternatively such that the separator 4 is affixed to the other side of the three-layer plate-like assembly facing the fuel electrode 3. Then, the multi-layered cell assembly NC may be comprised of a plurality of these cells C. In this case, the inner cell flow passages x are exposed to the fuel electrode 3. Hence, these inner cell flow passages x function as the fuel gas flow passages f. On the other hand, the inter-cell flow passage y is exposed to the oxygen electrode. So that, this inter-cell flow passage y functions as the oxygen-containing gas flow passage s.

(3) In the foregoing first embodiment, the cell layer nC may be comprised of more than three cells C. Further, a plurality of cell assemblies NC may be juxtaposed to each other with the opened sides thereof being oriented in opposition to each other.

(4) In the second and third embodiments, the plurality of cell assemblies NC may be juxtaposed to each other with the opened sides thereof being oriented in opposition to each other.

(5) In the fourth and fifth embodiments, the number of the cell assemblies NC to be juxtaposed to each other may vary according to the necessity and convenience.

(6) In the fourth embodiment, the cell layer nC may be comprised of more than four cells C. In this case, the inner gas flow passage I and the outer gas flow passage O are used respectively as the inner cell gas supply passage Xs or the inner cell gas exhaust passage Xe, so that the inner cell gas supply passages Xs and the inner cell gas exhaust passages Xe are disposed alternately in the juxtaposing direction of the cell layer nC.

Further, alternatively, the outer gas flow passages adjacent each other in the juxtaposing direction of the cell assemblies may be used as the inner cell gas supply passages Xs or inner cell gas exhaust passages Xe while the inner gas flow passages I adjacent each other in the juxtaposing direction of the cell assemblies are used as the inner cell gas supply passages Xs or inner cell gas exhaust passages Xe, such that the inner cell gas supply passages Xs and the inner cell gas exhaust passages Xe are disposed alternately not only in the juxtaposing direction of the cell layers nC but also in the juxtaposing direction of the cell assemblies NC.

(7) In the fifth embodiment, the inner gas flow passage I is used as the inner cell gas exhaust passage Xe while the opposed outer gas flow passages O are used as the inner cell gas supply passages Xs, respectively. Instead, the inner gas flow passage may be used as the inner cell gas supply passage Xs while using the opposed outer gas flow passages O as the inner cell gas exhaust passages Xe, respectively.

(8) As a developed construction of the fifth embodiment, for constructing the cell layer nC, a plurality of cells C may be interconnected via the cell connecting plate members 6 having no through holes 65, to form together a cell module.

Then, a plurality of these cell modules are interconnected via further cell connecting plate members 6 having the through holes 65. In this case, the inner gas flow passage I and the outer gas flow passage O will be used respectively as the inner cell gas supply passage or the inner cell gas exhaust passage, so that the inner cell gas supply flow passages Xs and the inner cell gas exhaust passages Xe are disposed alternately in the juxtaposing direction of the cell layers nC.

(9) A plurality of cell assemblies NC may be juxtaposed to each other with a distance therebetween with the sides thereof to which the inter-cell flow passages y are opened being oriented in opposition to each other, so that the space between the adjacent assemblies may be used as the inter-cell gas supply passage Ys or the inter-cell gas exhaust passage Ye. In this case, the inter-cell gas supply passages Ys and the inter-cell gas exhaust passages Ye will be arranged alternately in the juxtaposing direction of the cell assemblies NC. Also, the inter-cell gas supply passages Ys will be communicated with the inter-cell gas supply pipes 19 and the inter-cell gas exhaust passages Ye will be communicated with the inter-cell gas exhaust pipes 20, respectively.

(10) The cell assembly NC comprised of the vertically stacked cell layers nC as employed in the first, second, third, fourth or fifth embodiment may be mounted on the base mount 11 with orienting the stacking direction in the horizontal direction.

(11) The cell assembly NC comprised of the horizontally stacked cell layers nC as in the sixth embodiment may be mounted on the base mount 11 with orienting the stacking direction in the vertical direction.

Further and other objects, features and effects of the invention will become more apparent from the following more detailed description of the embodiments of the invention with reference to the accompanying drawings.

What is claimed is:

1. A fuel cell comprising:

a rectangular plate-like cell including a solid electrolyte layer having an oxygen electrode on one side thereof and a fuel electrode on the other side thereof, and a flow-passage forming member affixed to one of said sides of the electrolyte layer;

a cell layer including a plurality of said cells juxtaposed to each other in the direction of plane of the cell, with opened sides of adjacent cells, to which inner cell flow passages are opened, being aligned in opposition to each other;

a cell assembly including a plurality of said cell layers stacked one above another with a set distance therebetween;

said inner cell flow passages being formed by said flow-passage forming member, and being opened on one pair of opposed opened sides of the cell and closed on the other pair of oppposed closed sides of the cell;

an inter-cell flow passaage formed between the cells adjacent each other in the stacking direction of the cell layer, said inter-cell flow passage being closed on said opposed opened sides of the cell and opened on said opposed closed sides of the cell;

a cell connector member for supporting the adjacent cells of each cell layer and supporting also adjacents cells in the stacking direction of the cell layers with a set distance therebetween, said cell connector member interconnecting said inner cell flow passages of the adjacent cells of each cell layer and forming a connecting flow passage partitioned from said inter-cell flow passage;

said cell connector member comprising a cell connecting plate member including a cutout portion extending from one side edge to the opposite side edge thereof, and a pair of partition wall portions provided on opposed sides of the cutout portion and extending along the entire length of the cutout portion;

said cutout portion allowing, at each of opposed ends thereof, introduction of said opened side of the cell, said cutout portion having a cutting depth about the same as the thickness of the cell; and an abutment face defined in each end face of the partition wall portions disposed on the opposed sides of the cutout portion, said abutment face coming into sealed abutment against said closed side of the cell adjacent the opened side thereof when the closed side is fitted into an end of the cutout portion.

2. A fuel cell as defined in claim 1, wherein said connecting flow passage is formed by the cutout portion of the cell connecting plate member as being partitioned by the partition wall portions opposed to each other across the cutout portion and partitioned also by a further cell connecting plate member adjacent to the former cell connecting plate member.

3. A fuel cell as defined in claim 1, wherein said cell connecting plate member defines a through hole facing the cutout portion and extending through this plate member in the stacking direction; the through hole defines an inner gas flow passage for communicating the connecting flow passages of the each cell layer; and outer gas flow passages are formed on the opposed sides in the juxtaposing direction of the cells of the cell layer.

4. A fuel cell as defined in claim 1, wherein at least one of the abutment faces is inclined, in the stacking direction of the cell layers, so as to gradually approach the other abutment face as the inclined abutment face extends from the end of the cutout portion toward the inner side thereof; and the closed side of the cell includes a matching inclined portion which may be placed in sealed abutment against the inclined abutment face.

5. A fuel cell as defined in claim 1, wherein a plurality of said cell assemblies are juxtaposed side by side, with the opened sides thereof to which said inter-cell flow passages are opened being placed in opposition to each other.

6. A fuel cell as defined in claim 3, wherein said inner gas flow passage is used as an inner cell gas supply passage.

7. A fuel cell as defined in claim 3, wherein said inner gas flow passage is used as an inner cell gas exhaust passage.

8. A fuel cell as defined in claim 1, further comprising:

a cell holder member provided at each of the opposed ends of the cell layer in the cell juxtaposing direction, said cell holder member including a cutout portion for introducing the opened side of the cell, and a through hole facing the cutout portion and extending through in the stacking direction of the cell layers, wherein, said cutout portion includes a pair of abutment faces against which the closed sides adjacent the opened side of the cell are to be brought into sealed contact; and said cutout portion has about the same depth as the thickness of the cell.

9. A fuel cell as defined in claim 8, wherein, each of the opposed ends where the terminal ends of the cell layer in the cell juxtaposing direction are located, said through holes of the cell holder members together form a flow passage extending continuously in the stacking direction of the cell layers; and said opposed flow passages comprise said outer gas flow passages communicated with the inner cell flow passages of the respective cells adjacent in the stacking direction of the cell layers.

10. A fuel cell as defined in claim 9, wherein one of said outer gas flow passages on the opposed sides in the juxtaposing direction of the cells of the cell layer is used as an inner cell gas exhaust passage and said inner gas flow passage adjacent thereto is used as an inner cell gas supply passage; and said other outer gas flow passage is used as a further inner cell gas supply passage and said inner gas flow passage adjacent thereto is used as a further inner cell gas exhaust passage.

11. A fuel cell as defined in claim 3, wherein in said cell layer, said cell connecting plate member interposed between the adjacent cells juxtaposed in the center of the cell layer has said through hole and said cell connecting plate member interposed between the other adjacent cells of the cell layer has no through hole.

12. A fuel cell as defined in claim 11, wherein said inner gas flow passage is used as the inner cell gas exhaust passage and said opposed gas flow passages are used as the inner cell gas supply passages, respectively.

13. A fuel cell as defined in claim 1, wherein, each of said opposed partition wall portions of the cell connecting plate member includes a cutout portion extending in parallel with the juxtaposing direction of the cells of the cell layer.

14. A fuel cell as defined in claim 13, further comprising:

a pair of partition wall members disposed to cover a pair of sides of said cell assembly where said closed sides of the cells are located.

15. A fuel cell as defined in claim 14, wherein a space formed between one of said partition wall members and said opened side of the cell assembly is used as an inter-cell gas supply passage, and a space formed between the other partition wall member and said opened side of the cell assembly is used as an inter-cell gas exhaust passage, respectively; and said cutout portion of the cell connecting plate member communicate said inter-cell gas supply passages with each other and communicate also said inter-cell gas exhaust passages with each other, respectively.

16. A fuel cell as defined in claim 3, wherein said inner gas flow passages and said outer gas flow passages are used so as to provide said inner cell gas supply passage and said inner cell gas exhaust passage alternately to each other.

17. A fuel cell as defined in claim 1, wherein said stacking direction comprises the vertical direction.

18. A fuel cell as defined in claim 1, wherein said stacking direction comprises the horizontal direction.

\* \* \* \* \*

UNITED STATES PATENT AND TRADEMARK OFFICE
CERTIFICATE OF CORRECTION

PATENT NO. : 5,549,982  
DATED : August 27, 1996  
INVENTOR(S) : Kosuke Akagi

It is certified that error appears in the above-indentified patent and that said Letters Patent is hereby corrected as shown below:

Column 1 Line 14 after "juxtaposed" insert --in--.

Column 3 Line 23 after "gas" insert --is--.

Column 4 Line 31 "faces," should read --faces.--.

Column 7 Line 26 "carmet" should read --cermet--.

Column 7 Line 35 "C," should read --C.--.

Column 7 Line 42 "C These" should read --C. These--.

Column 10 Line 22 "Which" should read --which--.

Column 10 Line 51 "lave" should read --have--.

Column 10 Line 52 "oil" should read --of--.

Column 12 Line 38 "robe" should read --to be--.

UNITED STATES PATENT AND TRADEMARK OFFICE
CERTIFICATE OF CORRECTION

PATENT NO. : 5,549,982
DATED : August 27, 1996
INVENTOR(S) : Kosuke Akagi

It is certified that error appears in the above-indentified patent and that said Letters Patent is hereby corrected as shown below:

Column 16 Line 8 before "sixth" insert --A--.

Column 16 Line 35 "58," should read --53,--.

Column 17 Line 34 "inter-cell cell" should read --inter-cell--.

Column 18 Line 51 after "member" insert --16--.

Signed and Sealed this

Nineteenth Day of November, 1996

Attest:

BRUCE LEHMAN

Attesting Officer     Commissioner of Patents and Trademarks